(12) United States Patent
Nakura et al.

(10) Patent No.: US 8,399,113 B2
(45) Date of Patent: Mar. 19, 2013

(54) NONAQUEOUS ELECTROLYTE SECONDARY BATTERY

(75) Inventors: Kensuke Nakura, Osaka (JP); Hajime Nishino, Nara (JP); Miyuki Nakai, Osaka (JP); Mikinari Shimada, Osaka (JP)

(73) Assignee: Panasonic Corporation, Osaka (JP)

( * ) Notice: Subject to any disclaimer, the term of this patent is extended or adjusted under 35 U.S.C. 154(b) by 672 days.

(21) Appl. No.: 12/596,579

(22) PCT Filed: Apr. 10, 2008

(86) PCT No.: PCT/JP2008/000948
§ 371 (c)(1),
(2), (4) Date: Oct. 19, 2009

(87) PCT Pub. No.: WO2008/132797
PCT Pub. Date: Nov. 6, 2008

(65) Prior Publication Data
US 2010/0119932 A1    May 13, 2010

(30) Foreign Application Priority Data

Apr. 19, 2007  (JP) .................................. 2007-110585

(51) Int. Cl.
*H01M 10/50*  (2006.01)
*H01M 2/00*  (2006.01)

(52) U.S. Cl. ............................. 429/62; 429/61; 429/163

(58) Field of Classification Search .................. 429/163, 429/52
See application file for complete search history.

(56) References Cited

U.S. PATENT DOCUMENTS

| 6,051,341 | A  | 4/2000 | Terasaki |
| 2006/0051663 | A1 | 3/2006 | Fujita et al. |

(Continued)

FOREIGN PATENT DOCUMENTS

| CN | 1581561 | 2/2005 |
| EP | 0 851 525 A1 | 7/1998 |

(Continued)

OTHER PUBLICATIONS

Extended European Search Report, issued in European Patent Application No. EP 08 738 554.8, dated Jul. 6, 2011.

(Continued)

*Primary Examiner* — Patrick Ryan
*Assistant Examiner* — Muhammad Siddiquee
(74) *Attorney, Agent, or Firm* — McDermott Will & Emery LLP

(57) ABSTRACT

An object of the present invention is to provide a high-energy density nonaqueous electrolyte secondary battery that controls the rise in temperature during short circuiting.

Used is a nonaqueous electrolyte secondary battery 1, including a battery case 2, and a positive electrode plate 5 having a positive electrode current collector and a positive electrode mixture layer containing a cathode material capable of absorbing and desorbing lithium, a negative electrode plate 6 having a negative electrode current collector and a negative electrode mixture layer containing an anode material capable of absorbing and desorbing lithium, a separator 7 held between the positive and negative electrode plates, and a nonaqueous electrolyte that are enclosed in the battery case, wherein at least one of the positive electrode plate 5 and the negative electrode plate 6 has an electrode plate resistance, as determined in the charged state in the thickness direction when pressurized at 50 kg/cm2, of 0.4 Ω·cm² or more.

15 Claims, 5 Drawing Sheets

U.S. PATENT DOCUMENTS

| | | | |
|---|---|---|---|
| 2007/0122715 A1* | 5/2007 | Fujino et al. | 429/251 |
| 2007/0254102 A1* | 11/2007 | Fukuoka et al. | 427/255.27 |
| 2009/0081547 A1 | 3/2009 | Nakura | |

FOREIGN PATENT DOCUMENTS

| | | |
|---|---|---|
| JP | 10-199574 | 7/1998 |
| JP | 2000-323143 | 11/2000 |
| JP | 2001-297763 A | 10/2001 |
| JP | 3362025 B2 | 1/2003 |
| JP | 2003-229119 | 8/2003 |
| JP | 2005-183179 | 7/2005 |
| JP | 2006-120604 | 5/2006 |
| JP | 2006-202702 | 8/2006 |
| JP | 2006-294597 | 10/2006 |
| JP | 2007-018985 | 1/2007 |
| JP | 2007-059387 | 3/2007 |
| WO | WO 2008/087814 A1 | 7/2008 |

OTHER PUBLICATIONS

Chinese Office Action issued in Chinese Patent Application No. 200880012544.2 dated Nov. 10, 2011.

* cited by examiner

NONAQUEOUS ELECTROLYTE SECONDARY BATTERY

RELATED APPLICATIONS

This application is the U.S. National Phase under 35 U.S.C. §371 of International Application No. PCT/JP2008/000948, filed on Apr. 10, 2008, which in turn claims the benefit of Japanese Application No. 2007-110585, filed on Apr. 19, 2007, the disclosures of which applications are incorporated by reference herein.

TECHNICAL FIELD

The present invention relates to a nonaqueous electrolyte secondary battery.

BACKGROUND ART

Recently, electronic devices are becoming more portable and codeless rapidly. Along with this trend, high-voltage and high-energy density nonaqueous electrolyte secondary batteries are increasingly commercialized as a power supply for driving electronic devices.

The positive electrode for such a nonaqueous electrolyte secondary battery generally contains a lithium composite oxide higher in oxidation-reduction potential such as lithium cobalt oxide, lithium nickel oxide, or lithium manganese oxide. Alternatively, the negative electrode for the nonaqueous electrolyte secondary battery generally contains a carbon material. In addition, a nonaqueous electrolyte containing a lithium salt such as $LiClO_4$ or $LiPF_6$ dissolved in a solvent has been used as the electrolyte for the nonaqueous electrolyte secondary battery. There is a separator placed between the positive electrode and the negative electrode. For example, a microporous film of a polyolefin-based material has been used as the separator.

If short circuiting occurs for some reason in the region of a nonaqueous electrolyte secondary battery where the resistance is relatively lower, there may be large electric current flowing intensely at the point of short circuiting point. In such a case, the battery may be heated to high temperature by rapid heat generation. Various measures are taken in producing a battery, for prevention of the battery from rising to high temperature by such short circuiting.

Specifically, measures to prevent contamination of the battery, for example with metal powders derived from raw materials, dust in the production atmosphere and others, are taken in the production process.

As for the configuration of battery, taken is a measure to prevent internal short-circuiting, by protecting exposed regions of the core material (current collector), which are the regions lower in resistance in the electrode, with an insulation tape. In addition, also used is a so-called shutdown function of shutting down ion current by collapse of micropores at high temperature, by using, for example, a microporous polyethylene film containing micropores that clogs by fusion at a temperature of approximately 135° C. as the separator. Such a separator, if used, stops flow of the short-circuit current and prevents heat generation by collapse of the micropores in separator, even if there is short circuiting generated in battery.

Patent Document 1 proposes a nonaqueous electrolyte secondary battery containing low-conductivity cathode material powder that controls the flow of current and reduces the Joule heat generation in the short circuited region in battery when short circuiting occurs.

Known as a test for determining the reliability during internal short-circuit is an internal short-circuit test by using a nail to be inserted into battery (hereinafter, referred to briefly as nail penetration test). High-energy density lithium secondary batteries releases large energy and are heated to high temperature rapidly when short-circuited in the nail penetration test.

When an lithium ion battery having a separator of a microporous polyethylene film having such a shutdown function, a lithium cobalt oxide-containing positive electrode, and a negative electrode containing graphite is analyzed in the nail penetration test, the separator shuts down ionic current flow in the short circuited region by the collapse of micropores caused by the Joule heat generated when it is heated to a temperature of approximately 135° C. However, there was still a problem of continued rise in battery temperature until the shutdown function is executed.

If the battery surface temperature rises continually, the temperature of the electronic devices using the battery rises. In such a case, the heat may affect the reliability of the electronic devices. Accordingly, it is desired to prevent heating of the battery by short circuiting, specifically to control the battery's maximum reachable temperature, for example, to about 80° C. or lower.

It was not possible to prevent the rise in battery surface temperature sufficiently in the nail penetration test, even when the method disclosed in Patent Document 1 of controlling the short-circuit current and reducing the Joule heat generation during internal short-circuit by using a low-conductivity (higher resistance) cathode material. For example, Patent Document 1 describes that $LiCoO_2$, which has a higher resistance when the powder resistances of $LiCoO_2$ and $LiNiO_2$ are compared in the discharged state comparison, is more resistant to internal short circuiting (paragraph [0012]). Thus in Patent Document 1, only the conductivity of the cathode material in the discharged state was studied. However, when charged to some extent, $LiCoO_2$ has a significantly different powder resistance, which is similar to or lower than the powder resistance of $LiNiO_2$ in the charged state. Therefore, it is difficult to control the short-circuit current in a battery in the charged state sufficiently, only by specifying the powder resistance of the cathode material.

Patent Document 1: Japanese Patent No. 3362025

SUMMARY OF THE INVENTION

An object of the present invention, which was made to solve the problems above, is to provide a high-energy density nonaqueous electrolyte secondary battery that is sufficiently resistant to the rise in battery temperature when short circuiting occurs.

Accordingly, an aspect according to the present invention is a nonaqueous electrolyte secondary battery, comprising; a positive electrode plate having a positive electrode current collector and a positive electrode mixture layer containing a cathode material capable of absorbing and desorbing lithium, a negative electrode plate having a negative electrode current collector and a negative electrode mixture layer containing an anode material capable of absorbing and desorbing lithium, a separator held between the positive electrode plate and the negative electrode plate, a nonaqueous electrolyte, and, a battery case which enclose the positive electrode plate, the negative electrode plate, the separator, and the nonaqueous electrolyte therein, wherein at least one of the positive electrode plate and the negative electrode plate has an electrode plate resistance, as determined in the charged state and when pressurized at 50 kg/cm², of 0. 4Ω·cm² or more in the thickness direction.

The object, characteristics, aspects, and advantages of the present invention will become more evident in the following detailed description and the drawings attached.

DESCRIPTION OF THE PREFERRED EMBODIMENTS

Figure 1:
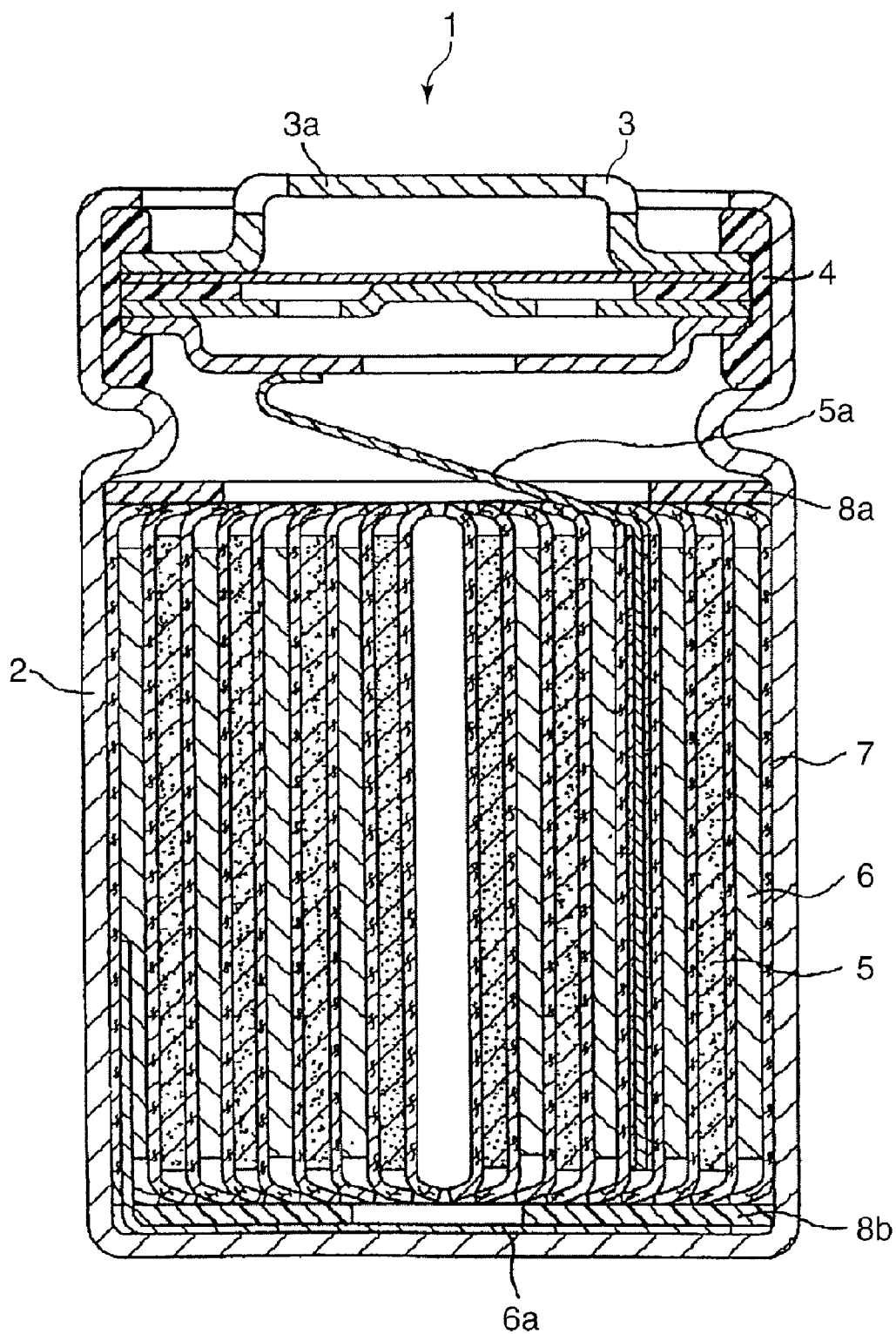
FIG. 1 is a vertical crosssectional view of the nonaqueous electrolyte secondary battery in an embodiment of the present invention.

The inventors have studied the mechanism of the temperature rise on the battery surface during nail penetration test intensively, and found consequently that the short circuiting via current collector does not last long during the nail penetration test because the current collector for the electrode plate in the short-circuited region disappears instantaneously as burnt by the Joule's heat. They have thus found that the period of short circuiting was governed by the short circuiting between the positive electrode mixture layer on the positive electrode plate and the negative electrode mixture layer on the negative electrode plate.

Two modes of short circuiting are possible as the short circuiting occurring between the positive electrode mixture layer and the negative electrode mixture; a mode of direct short circuiting between the positive electrode mixture layer and the negative electrode mixture layer and another mode of indirect short circuiting via nail between the positive electrode mixture layer and the negative electrode mixture layer. The inventors have studied these two kinds of modes in detail, and found consequently that the short-circuit current flowing between the positive and negative electrode mixture layers is more influenced by the mode of directly short circuiting between the positive and negative electrode mixture layers and the mode is influenced significantly by the electrode plate resistance, i.e., the sum of the resistance of each mixture layer in the charged state and the interfacial resistance between each mixture layer and the current collector. Thus, they have found, based on the findings above, that the electrode plate resistance in the charged state should be not less than a particular value for control of the short-circuit current.

First, the configuration of a nonaqueous electrolyte secondary battery in an embodiment of the present invention will be described with reference to FIG. 1.

The nonaqueous electrolyte secondary battery 1 in the present embodiment has a configuration in which electrodes consisting of a positive electrode plate 5 and a negative electrode plate 6 wound as separated by a separator 7 are enclosed with a nonaqueous electrolyte in a battery case 2. A positive electrode lead 5a and a negative electrode lead 6a are connected respectively to the positive electrode plate 5 and the negative electrode plate 6. In addition, a top insulation plate 8a is placed on the top face of the electrode plates and a bottom insulation plate 8b on the bottom face. Further, the opening of the battery case 2 is sealed with a sealing plate 3, and a positive electrode terminal 3a of the sealing plate 3 is electrically connected to the positive electrode lead 5a.

The positive electrode plate 5 and/or the negative electrode plate 6 is configured to have an electrode plate resistance in the thickness direction, as determined in the charged state and when pressurized at 50 kg/cm², is 0. 4Ω·cm² or more.

Figure 2:
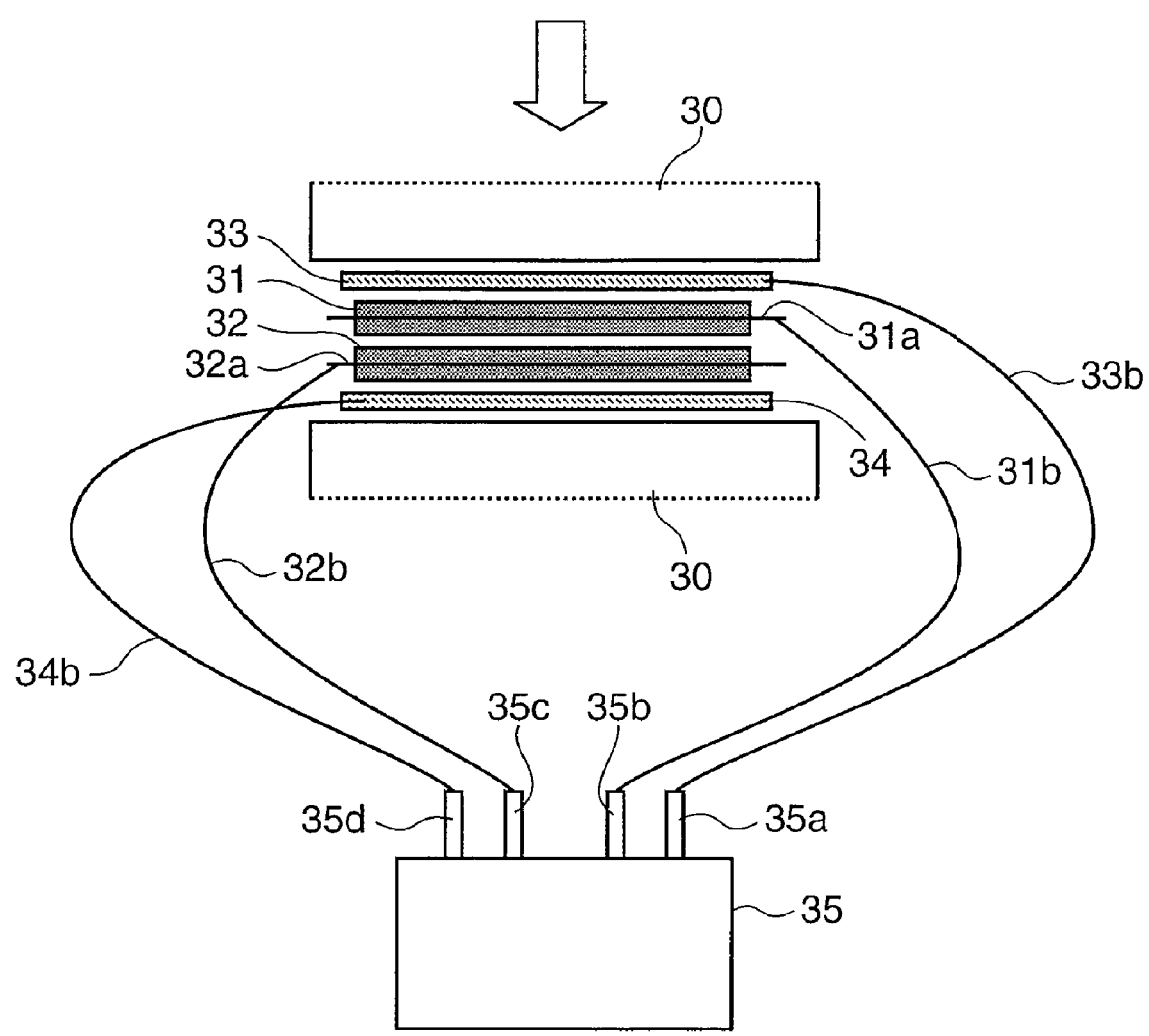
FIG. 2 is a schematic view explaining the method of measuring the electrode plate resistance in an embodiment of the present invention.

Hereinafter, the method of measuring the electrode plate resistance will be described. FIG. 2 is a schematic view of a device for measuring the resistance of the electrode plate. In FIG. 2, 30 represents a pressing machine; 31 and 32 represent electrode plates; 33 and 34 represent a copper plate having a thickness of 2 mm; and 35 represents an ohm meter. The current collectors 31a and 32a for the electrode plates 31 and 32 are connected respectively to lead wires 31b and 32b. The lead wires 31b and 32b are also connected to the terminals 35b and 35c of the ohm meter 35. The copper plates 33 and 34 holding the electrode plates 31 and 32 inside are connected respectively to the lead wires 33b and 34b. The lead wires 33b and 34b are connected respectively to the terminals 35a and 35d of the ohm meter 35. Electrode plates cut off in a particular size, for example 20×20 mm, from a previously charged battery are used as the electrode plates 31 and 32 to be measured. The electrode plate resistance when the electrode plates 31 and 32 are pressed at a pressure of 50 kg/cm² by the pressing machine 30 is determined with the ohm meter 35 by direct-current 4-terminal method.

The charged state in the present invention means a state at which the battery is charged in an amount of 10% or more with respect to the capacity of the battery.

As described above, when at least one of the positive electrode plate and the negative electrode plate has an electrode plate resistance, as determined in the charged state and when pressurized at 50 kg/cm², of 0. 4Ω·cm² or more in the thickness direction and in the charged state, i.e., when it is in the state at a charge rate of 10% or more, it is possible to control the short circuiting between the positive electrode and the negative electrode effectively and thus, to prevent continued short circuiting when it occurs in the battery.

The method of controlling the electrode plate resistance, as determined in the charged state and when pressurized at 50 kg/cm², to 0. 4Ω·cm² or more in the thickness direction is not particularly limited. Typical examples thereof include a method of raising the resistance of the positive electrode mixture layer, a method of raising the resistance of the negative electrode mixture layer, a method of raising the interfacial resistance between the mixture layer and the current collector on the positive electrode plate and/or the negative electrode plate, and the like. Each of the methods above will be described in detail below, together with the aspects of the present invention.

The positive electrode plate in the present embodiment will be described below.

Figure 3:
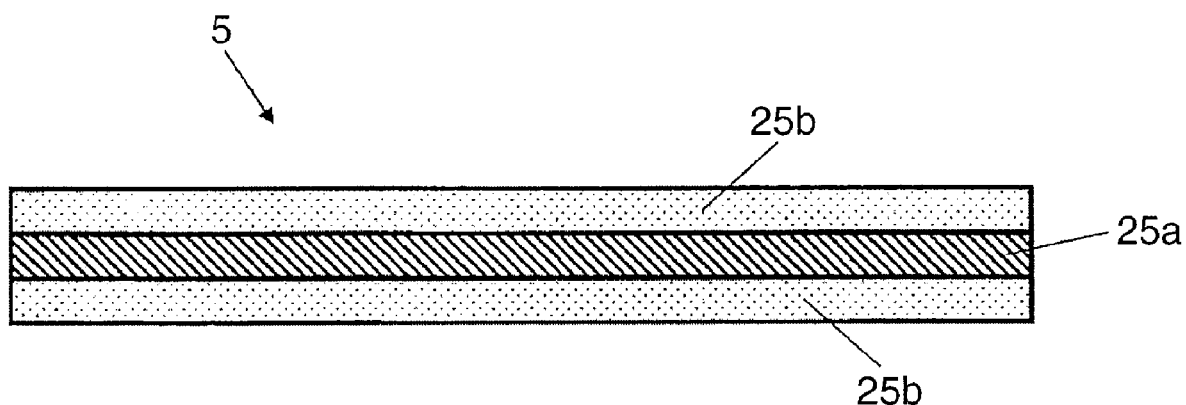
FIG. 3 is a schematic crosssectional view illustrating the positive electrode plate in an embodiment of the present invention.

FIG. 3 is a crosssectional view illustrating the configuration of the positive electrode plate 5. The positive electrode plate 5 has a positive electrode current collector 25a and positive electrode mixture layers 25b containing a cathode material capable of absorbing and desorbing lithium formed on the surfaces thereof.

The positive electrode mixture layer 25b contains a cathode material capable of absorbing and desorbing lithium and, as needed, other additive such as conductor, insulative powder material, binder resin, and the like.

Examples of the cathode material capable of absorbing and desorbing lithium contained in the positive electrode mixture layer include lithium composite oxides represented by the following General Formula (1) such as lithium cobalt oxide, lithium nickel oxide, and the derivatives thereof; lithium manganese oxide; polyanion cathode materials having an olivine- or NASICON-type structure such as lithium-containing iron phosphate, and the like.

$$Li_xM_{1-y}L_yO_2 \quad (1)$$

(in General Formula (1), $0.85 \leqq x \leqq 1.25$; $0 \leqq y \leqq 0.5$; M represents at least one element selected from the group consisting of Ni and Co; and L represents at least one element selected from the group consisting of alkali-earth elements, transition elements excluding Ni and Co, rare earth elements, group IIIb elements and group IVb elements).

Among the cathode materials above, lithium composite oxides represented by General Formula (1) are used particularly favorably. In particular among them, lithium composite oxides wherein L is at least one element selected from the group consisting of Al, Mn, Ti, Mg, Zr, Nb, Mo, W and Y, which give a cathode material particularly higher in resistance because of increase in the band gap or in localization of the d orbital of the element M, are used particularly favorably.

Among the lithium composite oxides in any compositions, use of a lithium composite oxide carrying at least one element selected from the group consisting of Al, Mn, Ti, Mg, Zr, Nb, Mo, W and Y in the surface layer as the cathode material is particularly preferable, for improvement in resistance of the active material powder in the charged state. Such a lithium composite oxide can be prepared, for example, by mixing a lithium composite oxide in any composition with a small amount of a compound containing the various elements and baking the mixture at proper temperature. In another method, a lithium composite oxide carrying the various elements deposited on the surface is prepared by mixing a solution or dispersion of a compound containing small amounts of the various elements with a lithium composite oxide in any composition and eliminating the liquid component. The lithium composite oxide carrying small amounts of the various elements on the surface is preferably baked at proper temperature.

The addition amount of the compound containing various elements is preferably 0.0001 to 0.05 mole with respect to 1 mole of the lithium composite oxide in any composition.

The average particle diameter of the cathode material is not particularly limited, but preferably 7 to 20 μm.

The conductor contained in the positive electrode mixture layer is not particularly limited, if it is an electronically conductive material chemically stable in the assembled battery. Typical examples of thereof include graphites such as natural graphites (e.g., scaly graphite) and synthetic graphites; carbon blacks such as acetylene black, Ketjen black, channel black, furnace black, lamp black, and thermal black; conductive fibers such as carbon fiber and metal fibers; carbon fluoride; metal powders such as aluminum; conductive whiskers such as zinc oxide and potassium titanate; conductive metal oxides such as titanium oxide; organic conductive materials such as polyphenylene derivatives; and the like. These compounds may be used alone or in combination of two or more. Among them, synthetic graphite and acetylene black are used particularly favorably.

The content of the conductor contained in the positive electrode mixture layer is, for example, in the range of 1 to 50 mass %, but the content is preferably lower for increase in the resistance of the positive electrode mixture layer. Specifically, it is preferably 30 mass % or less, more preferably 15 mass % or less. The conductor may not be contained, if favorable battery characteristics are retained.

The positive electrode mixture layer may contain an insulative powder material additionally for improvement in resistance of the positive electrode mixture layer.

The insulative powder material for use is not particularly limited, if it is a powder material having a resistance higher than that of the cathode material. Specifically, for example, an insulative powder material having a resistivity, as determined at 25° C. as it is pressed to a compression density of 4 g/cm$^3$, of 10$^{10}$ (Ω·cm) or more is used favorably. Typical examples of the insulative powder materials include alumina such as α-alumina, titania (TiO$_2$), silica (SiO$_2$), zirconia, magnesia and the like. These compounds may be used alone or in combination of two or more. α-Alumina and magnesia are used favorably among them, from the viewpoints of stability, cost, and easiness in handling.

The content of such an insulative powder material is preferably about 1 to 20 parts by mass with respect to 100 parts by mass of the cathode material, for favorable improvement in resistance of the positive electrode mixture.

The binder contained in the positive electrode mixture layer may be any thermoplastic or thermosetting resin traditionally used as binder. Typical examples thereof include polyethylene; polypropylene; polytetrafluoroethylene (PTFE); polyvinylidene fluoride (PVDF); styrene butadiene rubber; acrylonitrile unit-containing rubber polymers (modified acrylonitrile rubbers); tetrafluoroethylene-hexafluoroethylene copolymers; tetrafluoroethylene-hexafluoropropylene copolymers (FEP); tetrafluoroethylene-perfluoroalkyl vinylether copolymers (PFA); vinylidene fluoride-hexafluoropropylene copolymers; vinylidene fluoride-chlorotrifluoroethylene copolymers; ethylene-tetrafluoroethylene copolymers (ETFE resins); polychloro-trifluoroethylene (PCTFE); vinylidene fluoride-pentafluoropropylene copolymers; propylene-tetrafluoroethylene copolymers; ethylene-chlorotrifluoroethylene copolymers (ECTFE); vinylidene fluoride-hexafluoropropylene-tetrafluoroethylene copolymers; vinylidene fluoride-perfluoromethylvinylether-tetrafluoroethylene copolymers; ethylene-acrylic acid copolymers or the ionically (Na$^+$) cross-linked derivatives thereof; ethylene-methacrylic acid copolymers or the ionically (Na$^+$) cross-linked derivatives thereof; ethylene-methyl acrylate copolymer or the ionically (Na$^+$) cross-linked derivatives thereof; ethylene-methyl methacrylate copolymer or the ionically (Na$^+$) cross-linked derivatives thereof; and the like. These compounds may be used alone or in combination of two or more. Among the compounds above, polyvinylidene fluoride (PVDF) and polytetrafluoroethylene (PTFE) are used favorably.

The content of the binder is preferably about 0.5 to 7 parts by mass, with respect to 100 parts by mass of the cathode material.

The positive electrode mixture is prepared by kneading the components above or dissolving or dispersing the components in a liquid medium.

The positive electrode mixture layer is obtained by applying the positive electrode mixture thus prepared on the surface of a positive electrode current collector under pressure or coating and drying a slurry of the positive electrode mixture dissolved or dispersed in a liquid medium on the surface of the positive electrode current collector and then pressing the resulting layer.

A typical example of the composition of the positive electrode mixture layer formed with the respective components above will be described below.

Described will be a case when a positive electrode mixture contains a lithium composite oxide represented by General Formula (1) as the cathode material, acetylene black as conductor, PVDF as binder and an alumina as insulative powder material, and the positive electrode mixture is coated on the surface of an aluminum current collector having a thickness of 15 μm, and the resulting layer is roll-pressed under a linear pressure of 10 kN/cm. When the content of the conductor with respect to 100 parts by mass of the lithium composite oxide is expressed by "a" part by mass; the content of the binder, "b" part by mass; the content of the insulative powder material. "c" part by mass, the content of the conductor is preferably in the range of $0 \leq a \leq 3$, more preferably $0 \leq a \leq 2$; the content of the binder, preferably in the range of $0 \leq b \leq 7$, more preferably $0 \leq b \leq 3$; and the content of the insulative powder material, preferably in the range of $2 \leq c \leq 20$, more preferably $5 < c < 10$. The "c" value is set to less than 10 above, because addition of the binder in a greater amount makes it difficult to produce a high-capacity battery.

When the lithium composite oxides represented by General Formula (1) is a compound wherein L is at least one element selected from the group consisting of Al, Mn, Ti, Mg, Zr, Nb, Mo, W and Y, it is possible to reduce the contents of the conductor and the insulative powder material. In such a case, the content of the conductor with respect to 100 parts by mass of the lithium composite oxide is preferably in the range of $0 \leq a \leq 5$, more preferably $0 \leq a \leq 1$; the content of the binder, preferably in the range of $0 < b \leq 7$, more preferably $0 < b < 3$; and the content of the insulative powder material, preferably in the range of $0 \leq c < 5$, more preferably $0 \leq c < 2$.

Alternatively if a lithium composite oxide carry at least one element selected from the group consisting of Al, Mn, Ti, Mg, Zr, Nb, Mo, W and Y in the surface layer is used, it is possible to reduce the content of the insulative powder material without reduction in the amount of the conductor. In such a case, the content of the conductor with respect to 100 parts by mass of the lithium composite oxide is preferably in the range of $0 \leq a \leq 5$, more preferably $0 \leq a \leq 1$; the content of the binder, preferably in the range of $0 < b \leq 7$, more preferably $0 < b < 3$; and the content of the insulative powder material, preferably in the range of $0 \leq c < 5$, more preferably $0 \leq c < 2$.

The positive electrode current collector for use is not particularly limited, if it is a sheet of an electronically conductive material chemically stable in the assembled battery. Typical examples thereof include sheets such as of aluminum, stainless steel, nickel, titanium, carbon, and conductive resins, nonconductive sheets of a resin or the like coated with aluminum, and the like. Among the materials above, a sheet of aluminum or an aluminum alloy is particularly favorable.

The shape of the positive electrode current collector is not particularly limited, and examples thereof include foils, films, sheets, porous materials, foams, and molded articles of fibers, and the like. The thickness of the positive electrode current collector is also not particularly limited and preferably 1 to 500 μm.

In addition, the positive electrode current collector may be oxidized, roughened, or flame-treated on the surface.

Hereinafter, the method of raising the interfacial resistance between the positive electrode mixture layer and the positive electrode current collector will be described.

The method of raising the interfacial resistance between the positive electrode mixture layer and the positive electrode current collector is for example a method of reducing the contact area between the conductor contained in the positive electrode mixture layer and the positive electrode current collector at the interface between the positive electrode mixture layer and the positive electrode current collector, or a method of reducing the contact area between the positive electrode mixture layer and the positive electrode current collector.

The method of reducing the contact area between the conductor contained in the positive electrode mixture layer and the positive electrode current collector at the interface between the positive electrode mixture layer and the positive electrode current collector is, for example, the following method of forming a positive electrode mixture layer by applying a positive electrode mixture on a softening-treated positive electrode current collector and rolling it.

The softening-treated positive electrode current collector is, for example, a positive electrode current collector obtained by softening a current collector, for example of aluminum, by heating at 200 to 350° C. for example for 5 to 10 hours. The heating means is not particularly limited, and for example, it is a method of heating the current collector under air atmosphere.

The reason for the decrease in the contact area between the conductor contained in the positive electrode mixture layer and the positive electrode current collector when a positive electrode mixture layer is formed on a softening-treated positive electrode current collector under pressure will be described below, with reference to FIG. 4.

Figure 4:
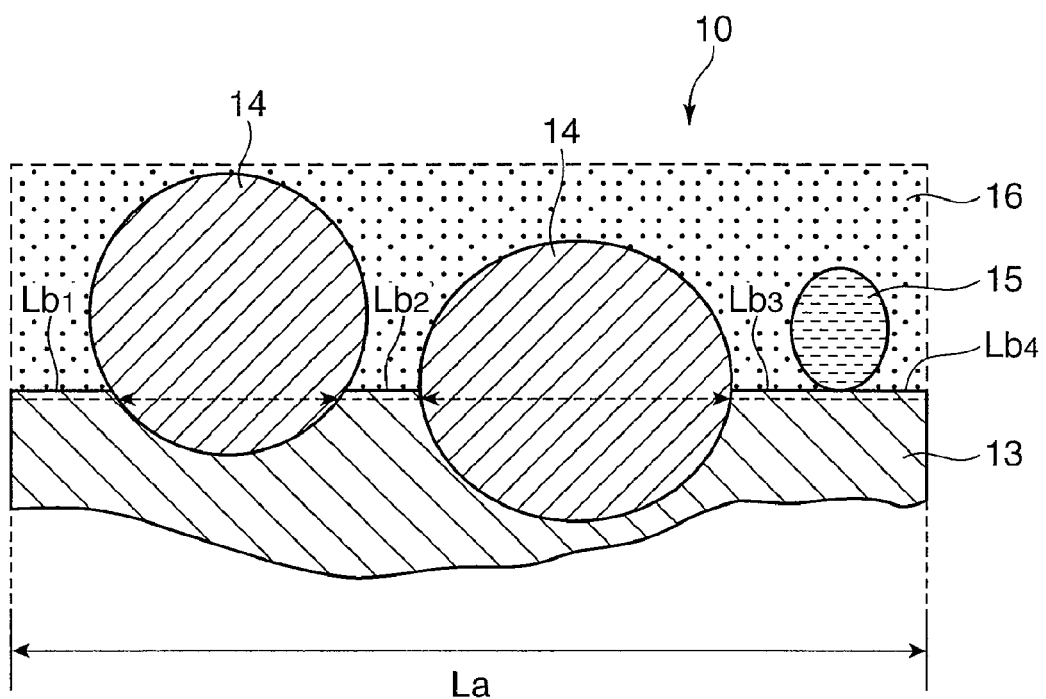
FIG. 4 is a schematic crosssectional view illustrating an active material embedded in the current collector.

FIG. 4 is a schematic crosssectional view, as observed under scanning electron microscope (SEM), illustrating the vertical section of a positive electrode plate 10 produced by forming a layer of an positive electrode mixture on a positive electrode current collector 13 under pressure.

When a positive electrode mixture layer 16 is formed on the surface of a softening-treated positive electrode current collector 13 by applying a positive electrode mixture containing a cathode material 14, a conductor 15, a binder and others under pressure, the cathode material 14 is embedded partially into the positive electrode current collector 13, because the positive electrode current collector 13 is softened. The number of the contact points between the positive electrode current collector 13 and the conductor 15 then decreases, seemingly as the conductor 15 present at the interface between the positive electrode mixture layer 16 and the positive electrode current collector 13 is pushed away by the embedding cathode material 14, resulting in increase in the interfacial resistance between the positive electrode mixture layer 16 and the positive electrode current collector 13.

As for the rolling condition when a positive electrode mixture layer 16 is formed by application of the positive electrode mixture by roll pressing, the inter-roller gap is preferably adjusted to a linear pressure of 12 to 15kN/cm. Rolling under such a rolling condition makes it easier to embed the cathode material 14 into the positive electrode current collector 13.

The rate of the cathode material 14 embedded into the positive electrode current collector 13 is calculated by the following calculation method, and the rate of the cathode material 14—embedded region in the entire surface of the positive electrode current collector 13 having the positive electrode mixture layer 16 is preferably 5% or more, more preferably 10% or more, for sufficient increase in the electrode plate resistance in the charged state.

The method of calculating the rate of the cathode material 14 embedded in the positive electrode current collector 13 will be described, with reference to FIG. 4.

As shown in FIG. 4, the length of the entire surface of the positive electrode current collector 13 La, as approximated as a straight line, is determined from the electron-microscope image observed. Then, the length of the line Lb on the surface where no embedded active material particle 14 is present (sum of Lb1 to Lb4 in FIG. 4, as approximated as a straight line, is determined.

The difference ΔL, i.e., (La−Lb), is calculated; the rate of ΔL to La, (ΔL/La×100(%)) is calculated; the value is approximated as a ratio of the area of the embedded cathode material 14 to the surface area of the positive electrode current collector 13 carrying the positive electrode mixture layer 16.

On the other hand, the method of reducing the contact area between the positive electrode mixture layer and the positive electrode current collector is, for example, a method of applying a positive electrode mixture layer on a positive electrode current collector having a surface insulation layer under pressure. The insulation layer means an insulative layer of an inorganic oxide filler-containing resin composition having a volumetric resistivity of $10^{10} \Omega \cdot cm$ or more. The method will be described with reference to FIG. 5.

Figure 5:
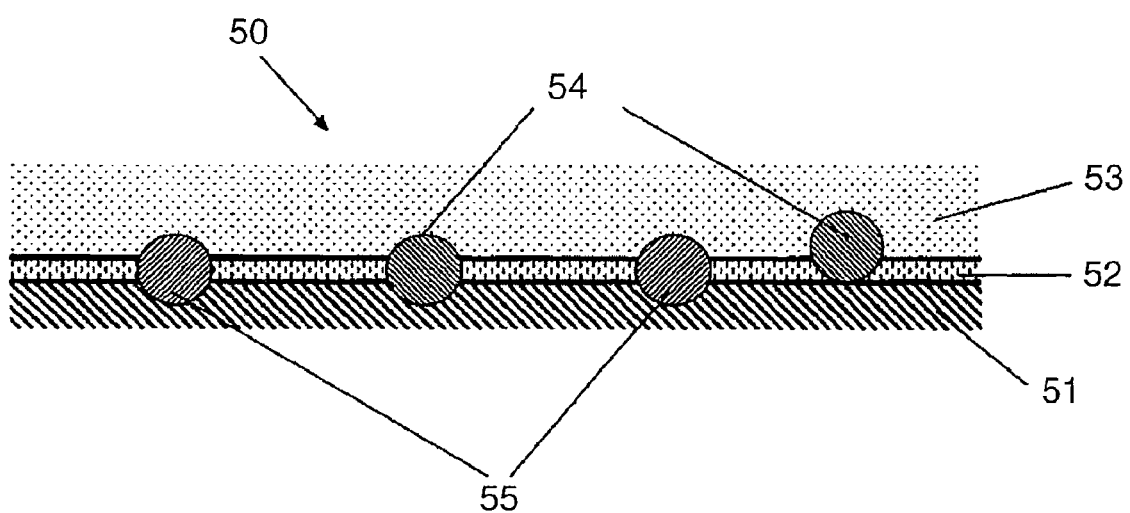
FIG. 5 is a schematic crosssectional view illustrating the positive electrode plate carrying an insulative resin film in an embodiment of the present invention embodiment.

In FIG. 5, shown is a positive electrode plate 50 having an insulation layer 52 formed on the surface of a positive electrode current collector 51 and a positive electrode mixture layer 53 formed additionally on the surface of the insulation layer 52. The cathode material particles 54 and the conductor particles 55 in the positive electrode mixture layer 53 are embedded in the positive electrode current collector 51 through the insulation layer 52.

Presence of the insulation layer 52 between the positive electrode current collector 51 and the positive electrode mixture layer 53 reduces the contact area between the positive electrode current collector 51 and the positive electrode mixture layer 53, leading to increase in interfacial resistance between the positive electrode current collector 51 and the positive electrode mixture layer 53.

The thickness of the insulation layer 52 is not particularly limited, if the designed capacity and the function of preventing short circuiting are preserved. Specifically, the thickness is preferably, for example, 1 to 15 μm, more preferably 3 to 15 μm. The insulation layer 52 may be formed on at least one face of the positive electrode current collector 51 but is preferably formed on both faces of the positive electrode current collector 51.

The positive electrode plate having an insulation layer on the surface of such a positive electrode current collector is obtained by forming a positive electrode mixture layer on the current collector surface carrying an insulative layer by means of applying the positive electrode mixture on the insulation layer and rolling it.

The positive electrode current collector having an insulation layer can be formed by coating an inorganic oxide filler-containing insulative resin composition on the surface of a positive electrode current collector.

The resin component contained in the resin composition is not particularly limited, and examples thereof include those similar to the binder resin contained in the positive electrode mixture. These resin components may be used alone or in combination of two or more. Among the resins above, fluoro polymers such as polyvinylidene fluoride (PVDF) and rubber polymers containing acrylonitrile units (modified acrylonitrile rubber), in particular acrylonitrile unit-containing rubber polymers, are used favorably from the points of favorable heat resistance, elasticity and binding efficiency.

The content of the inorganic oxide filler in insulation layer is preferably 50 mass % or more, more preferably 90 mass % or more, from the point of durability in rigidity. An inorganic oxide filler content of less than 50 mass % may lead to insufficient heat resistance. Alternatively, a content of more than 99 mass % may lead to increase in rigidity and brittleness of the insulation layer and thus, to deterioration in strength and in adhesiveness to the current collector surface or the electrode surface.

Typical examples of the inorganic oxide fillers for use include alumina ($Al_2O_3$), titania ($TiO_2$), silica ($SiO_2$), zirconia ($ZrO2$), magnesia (MgO), and the like. These fillers may be used alone or in combination of two or more. Particularly among the fillers above, alumina (in particular, α-alumina) and magnesia are preferable, from the viewpoints of stability, cost and easiness in handling.

The median diameter (D50: average diameter) of the inorganic oxide filler particles is not particularly limited, but preferably 0.1 to 5 μm, more preferably 0.2 to 1.5 μm.

Hereinafter, the negative electrode plate in the present embodiment will be described.

The elements similar to those used in the positive electrode plate will be described only briefly or not described, and different elements will be described in detail.

The negative electrode plate has a negative electrode mixture layer containing an anode material capable of absorbing and desorbing lithium formed on the surface of a negative electrode current collector.

The negative electrode mixture layer contains an anode material capable of absorbing and desorbing lithium and, as needed, other additives such as conductor, insulative powder material, binder resin and the like.

The anode material contained in the negative electrode mixture layer is not particularly limited, if it is a material electrochemically charging and discharging lithium. Typical examples thereof include graphite materials; graphitization-resistant carbonaceous materials; metal oxides such as silicon (Si)-containing silicon oxide and tin (Sn)-containing tin oxide; lithium alloys containing at least one element selected from silicon, tin, aluminum, zinc and magnesium; and the like. Among the compounds above, metal oxides such as silicon (Si)-containing silicon oxide and tin (Sn)-containing tin oxide are favorable, because it is possible to obtain a negative electrode plate having high electrode plate resistance in the charged state.

The average diameter of the anode material is not particularly limited, but preferably 1 to 30 μm.

Conductors, insulative powder materials, binder resins and the like similar to those described above for the positive electrode mixture can be used.

Similarly to the positive electrode mixture, the negative electrode mixture is also prepared by kneading the components above or dissolving or dispersing them in a liquid medium.

The negative electrode mixture layer is also prepared, for example, by coating or press-bonding the negative electrode mixture thus prepared on the surface of a negative electrode current collector and rolling it.

A foil, film, sheet or the like, for example of Cu or a Cu alloy, is used favorably as the negative electrode current collector. Use of a negative electrode current collector having on the negative electrode plate an insulation layer, similar to that formed on the positive electrode current collector leads to reduction of the contact area between the negative electrode current collector and the negative electrode mixture layer, and thus, to increase in the interfacial resistance between the negative electrode current collector and the negative electrode mixture layer.

Hereinafter, the separator in the present embodiment will be described.

The separator used in the nonaqueous electrolyte secondary battery in the present embodiment is not particularly limited, if it is an insulative microporous thin film having a particular mechanical strength and a particular solvent resistance. Specifically, a nonwoven or woven fabric of a fiber of olefinic polymer such as polypropylene or polyethylene or a glass fiber is used favorably.

In particular, for example, a polyethylene microporous film having a function to shut down ion current (shutdown function) by collapse of the micropores at high temperature is more preferably as the separator, because it stops heat generation by blocking the short-circuit current by collapse of the separator micropores even if short circuiting occurs in the battery.

The pore size of the separator is not particularly limited, if it is a diameter prohibiting penetration of the cathode material or the anode material, binder, conductor, insulative material powder and the like released from the electrode plates. Specifically, the pore size is preferably, for example, 0.01 to 1 µm. The porosity and the electron and ion permeability may vary according to the raw material and the film thickness used, but are all, preferably approximately 30 to 80%.

The thickness of the separator is preferably approximately 10 to 300 µm.

Hereinafter, the nonaqueous electrolyte in the present embodiment will be described.

The nonaqueous electrolyte used in the nonaqueous electrolyte secondary battery of the present embodiment contains a nonaqueous solvent and a lithium salt soluble in the solvent. Examples of the nonaqueous solvents include aprotic organic solvents including cyclic carbonates such as ethylene carbonate (EC), propylene carbonate (PC), butylene carbonate (BC), and vinylene carbonate (VC); linear carbonates such as dimethyl carbonate (DMC), diethyl carbonate (DEC), ethyl methyl carbonate (EMC), and dipropyl carbonate (DPC); aliphatic carboxylic esters such as methyl formate, methyl acetate, methyl propionate, and ethyl propionate; γ-lactones such as γ-butylolactone; linear ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide; 1,3-dioxolane; formamide; acetamide; dimethylformamide; dioxolane; acetonitrile; propionitrile; nitromethane; ethyl monoglyme; phosphotriesters; trimethoxymethane; dioxolane derivatives; sulfolane; methylsulfolane; 1,3-dimethyl-2-imidazolidinone; 3-methyl-2-oxaolydinone; propylene carbonate derivatives; tetrahydrofuran derivatives; ethylether; 1,3-propanesulfone; anisole; dimethylsulfoxide; N-methylpyrrolidone, and the like. These solvents may be used alone or in combination of two or more. Among the solvents above, mixed solvents of cyclic and linear carbonates or mixed solvents of cyclic and linear carbonates and aliphatic carboxylic esters are used favorably.

Examples of the lithium salt dissolved in the solvent include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylates, LiCl, LiBr, LiI, chloroborane lithium, tetraphenyllithium borate, imides, and the like. These salts may be used alone or in combination of two or more. Among them, $LiPF_6$-containing compounds are particularly preferable.

A typical favorable example of the non-aqueous electrolyte solutions is an electrolyte solution containing at least ethylene carbonate and ethyl methyl carbonate and $LiPF_6$ as the supporting electrolyte.

The concentration of the lithium salt dissolved in the solvent is preferably approximately 0.2 to 2 mol/l, more preferably approximately 0.5 to 1.5 mol/l.

Other additives may be added favorably to the non-aqueous electrolyte solution for improvement in charge/discharge characteristics. Typical examples of the additives include triethyl phosphite, triethanolamine, cyclic ethers, ethylenediamine, n-glyme, pyridine, hexaphosphoric triamide, nitrobenzene derivatives, crown ethers, quaternary ammonium salts, ethylene glycol dialkyl ethers and the like.

The positive and negative electrode plates, the separator, and the nonaqueous electrolyte in the present embodiment have been described above specifically. It is possible to reduce further the heat generation occurring when the nonaqueous electrolyte secondary battery is short-circuited, by the following method of installing an insulation layer between the positive electrode plate, the negative electrode plate and the separator.

Namely, a porous insulation layer may be formed on at least one surface of the positive electrode plate, the negative electrode plate, and the separator in the present embodiment, for control of the short-circuit current flowing by contact between the positive and negative electrode plates during short circuiting. Such a porous insulation layer formed reduces the short-circuit current flowing when the positive and negative electrode plates are short-circuited significantly without inhibition of the ionic permeation between the positive and negative electrode plates, consequently, controlling the heat generation during short circuiting.

The porous insulation layer formed on the surface of the positive or negative electrode plate is preferably a porous insulation layer that is formed with an insulative composition prepared by bonding the inorganic oxide filler particles contained in the insulation layer at a content of 50 mass % or more, preferably, 90 mass % or more, to each other with a binder, from the points of heat resistance and insulation. An inorganic oxide filler content of less than 50 mass % may result in insufficient heat resistance. Such a porous insulation layer may be formed only on one face of each electrode plate, but is preferably formed on both faces thereof.

The porous insulation layer is produced, for example, in the following manner:

An inorganic oxide filler, a binder and a solvent such a N-methylpyrrolidone are mixed, to give a paste. The paste obtained is coated on at least one face of a positive electrode plate to a particular thickness and dried thoroughly at a temperature allowing vaporization of the solvent. Evaporation of the solvent by drying leaves fine pores in the insulation layer.

The porosity of the porous insulation layer is preferably, approximately 30 to 90%, from the point of favorable electron and ion permeability. The thickness is preferably about 1 to 30 µm.

The insulation layer thus formed on the positive electrode plate and/or the negative electrode plate surface has an extremely high electrode plate resistance of $1 \times 10^{10}$ ($\Omega \cdot cm^2$) or more.

In addition, a heat-resistant porous insulation layer is preferably formed on at least one surface of the separator. It is possible to place a heat-resistant insulation layer between the positive electrode plate 5 and the negative electrode plate 6 by forming such a heat-resistant porous insulation layer. It is possible to prevent fusion of the resin separator even if the Joule heat is generated during short circuiting, by forming such a heat-resistant insulation layer.

The heat-resistant porous insulation layer formed on the separator preferably has as many pores as possible to the degree that the ionic conduction is not inhibited by collapse of the micropores in the separator and is particularly favorably formed with a resin component having a heat deflection temperature higher than the heat deflection temperature of the resin material forming the separator, generally a resin component having a heat deflection temperature of 250° C. or higher or a resin composition containing the resin component. When the separator is a resin separator, such a heat-resistant insulation layer formed on the separator surface makes the separator resistant to fusion even under the high-temperature environment of the nail penetration test, and consequently, inhibits the increase in the contact area between the positive electrode and negative electrode mixture layers and controls the heat generation by short circuiting.

Typical examples of the heat resistance resins having a heat deflection temperature of 250° C. or higher include polyamide resins such as aromatic polyamides (aramides), polyimide resins, polyamide-imide resins and the like. These resins may be used alone or in combination of two or more.

The heat deflection temperature in the present invention is the load deflection temperature, as determined by the test method of ASTM-D648 under a load of 1.82 MPa.

In addition, use of the heat-resistant resin component as a resin component for the resin composition containing an inorganic oxide filler is advantageous, because of further increase in mechanical strength and heat resistance. The content of the inorganic oxide filler in the resin composition containing a heat-resistant resin component is preferably 25 to 75 mass %, from the point of balance between flexibility and rigidity. The inorganic oxide filler similar to that contained in the above-mentioned insulation layer containing an inorganic oxide filler is used favorably as the inorganic oxide filler.

As for the porosity thereof, a pore diameter of about 0.01 to 10 μm and a porosity of about 30 to 70% are favorable, for preservation of favorable electronic and ionic permeability.

The separator having a heat-resistant porous insulation layer is produced, for example, in the following manner:

Resin components are dissolved in a solvent dissolving the heat-resistant resin components, to give a resin solution. A powder of a lithium salt soluble in the solvent such as lithium chloride is dissolved in the resin solution obtained. The solution obtained is then coated on a separator to a particular thickness under a particular condition and dried, to give a thin film. The separator carrying the thin film formed is immersed in a hot distilled water bath, for example, at around 60° C. for about 2 hours, allowing solubilization and removal of the lithium salt, to form a heat-resistant porous insulation layer.

As for the thickness of the insulation layer formed on the surface of the separator, when it is formed only on one face, the ratio AB, when the thickness of the separator is designated as A and the thickness of the insulation layer B, is preferably in the range below: $2 \leqq A/B \leqq 12$.

It is possible to obtain the nonaqueous electrolyte secondary battery 1 shown in FIG. 1 with the elements described above by enclosing electrodes formed with the positive electrode plate 5 and the negative electrode plate 6 wound via the separator 7 and a nonaqueous electrolyte in a battery case 2. The shape of the battery is not limited, and any shape, coin, button, sheet, laminate, cylindrical, flat, square, or large-sized for electric vehicle, may be used. The nonaqueous electrolyte secondary battery according to the present invention can be used in various applications including portable information systems, portable electronic devices, domestic small power storage apparatuses, motorcycles, electric vehicles, hybrid electric vehicles, and the like, but the applications are not particularly limited thereto.

Hereinafter the present invention will be described specifically with reference to Examples, but it should be understood that the present invention is not restricted by the following Examples.

EXAMPLES

Example 1

{Example Battery A1}

(i) Preparation of Lithium Composite Oxide I

Nickel sulfate and cobalt sulfate were mixed at Ni atom/Co atom molar ratio of 80:20. 3200 g of the mixture obtained was dissolved in 10 L of water, to give a raw solution. 400 g of sodium hydroxide was added to the raw solution for inducing precipitation. The precipitate was washed thoroughly with water and then dried, to give a coprecipitated hydroxide.

784 g of lithium hydroxide was mixed with 3000 g of the Ni—Co coprecipitated hydroxide obtained, and the mixture was baked under an atmosphere at a partial oxygen pressure of 0.5 atmospheric pressure and at a temperature of 750° C. for 10 hours, to give a lithium composite oxide I ($Li_{1.03}Ni_{0.8}Co_{0.20}O_2$).

Separately, various lithium nickel composite oxides were prepared, by using a variety of raw materials, replacing the Ni—Co coprecipitated hydroxide above. These composite oxides showed results similar to those for $Li_{1.03}Ni_{0.8}Co_{0.20}O_2$.

(ii) Preparation of Positive Electrode Plate 1000 g of the lithium composite oxide I obtained, 250 g of PVDF #1320 manufactured by Kureha Chemical Industry Co., Ltd. (N-methyl-2-pyrrolidone (NMP) solution containing PVDF at 12 mass %, 3 parts by mass of PVDF with respect to 100 parts by mass of lithium composite oxide), 20 g of acetylene black (2 parts by mass similarly), 20 g of alumina particles having an average diameter of 0.5 μm (2 parts by mass similarly), and a suitable amount of NMP were mixed in a double-shaft blender, to give a paste-like positive electrode mixture. The positive electrode mixture was coated and dried on both faces of an aluminum foil having a thickness of 20 μm.

Then, the aluminum current collector carrying the positive electrode mixture layers was roll-pressed with rollers with a clearance of 15 μm thrice, to give a positive electrode plate having a total thickness of 160 μm. Then, the positive electrode plate obtained was cut into pieces having a width allowing insertion into a cylindrical 18650 battery case, to give a positive electrode plate.

(iii) Preparation of Negative Electrode Plate 3000 g of a synthetic graphite, 200 g of BM-400B manufactured by Zeon Corporation (dispersion containing 40 mass % modified styrene-butadiene rubber), 50 g of carboxymethylcellulose (CMC) and a suitable amount of water were mixed in a double-shaft blender, to give a paste-like negative electrode mixture. The negative electrode mixture was coated and dried on both faces of a copper foil having a thickness of 12 μm, and the composite was roll-pressed to a total thickness of 160 μm. Then, the electrode plate obtained was cut into pieces allowing insertion into the battery case, to give a negative electrode plate.

(iv) Assembly of Battery

Description will be given with reference to FIG. 1. First, the positive electrode plate 5 and the negative electrode plate 6 were wound with a separator 7 held inside, to give electrode plates. The separator 7 used was a composite film of polyethylene and polypropylene (2300 manufactured by Celgard Co., Ltd., thickness: 25 μm).

A nickel positive electrode lead 5a and a nickel negative electrode lead 6a were connected respectively to the positive electrode plate 5 and the negative electrode plate 6. A top insulation plate 8a was placed on the top face of the electrode plates and a bottom insulation plate 8b on the bottom face thereof; the composite was inserted into the battery case 2; and 5 g of a non-aqueous electrolyte solution was injected into the battery case 2. The non-aqueous electrolyte solution used was a solution obtained by dissolving $LiPF_6$ at a concentration of 1.5 mol/L with mixed solvent of ethylene carbonate and methylethyl carbonate at a volume ratio of 10:30.

Subsequently, the positive electrode terminal 3a of the sealing plate 3 closing the opening of the battery case 2 was electrically connected to the positive electrode lead 5a, and the opening was sealed, to give a cylindrical 18650 lithium secondary battery. It was designated as Example battery A1.

{Example Battery A2}

Example battery A2 was prepared in a similar manner to Example battery A1, except that no acetylene black was added in preparation of the positive electrode plate.

{Example Battery A3}

Example battery A3 was prepared in a similar manner to Example battery A1, except that the alumina particles having an average diameter of 0.5 μm added in preparation of the positive electrode plate was used in an amount of 200 g.

{Example Battery A4}

Example battery A4 was prepared in a similar manner to Example battery A1, except that the PVDF #1320 was used in an amount of 42 g (approximately 0.5 parts by mass with respect to 100 parts by mass of the lithium composite oxide), instead of 250 g (3 parts by mass of PVDF), in preparation of the positive electrode plate.

{Example battery A5}

Example battery A5 was prepared in a similar manner to Example battery A1, except that 583 g of PVDF #1320 (approximately 7 parts by mass of PVDF with respect to 100 parts by mass of the lithium composite oxide) was used, replacing 250 g of PVDF #1320, in preparation of the positive electrode plate.

{Example Batteries A6 to A10}

Example batteries A6 to A10 were prepared in a similar manner to Example batteries A1 to A5, except that, in preparation of the positive electrode plate, the aluminum current collector carrying a positive electrode mixture was roll-pressed with rollers with a clearance of 5 μm once, instead of thrice with rollers with a clearance of 15 μm, to give a positive electrode plate having a total thickness of 160 μm.

{Example Batteries A11 to A15}

Example batteries A11 to A15 were prepared in a similar manner to Example batteries A1 to A5, except that the aluminum current collector carrying a positive electrode mixture was softened in air at 200° C. for 5 hours and then roll pressed in preparation of the positive electrode plate.

{Example Batteries A16 to A20}

Example batteries A16 to A20 were prepared in a similar manner to Example batteries A1 to A5, except that the aluminum current collector carrying a positive electrode mixture was softened in air at 300° C. for 5 hours and then roll-pressed in preparation of the positive electrode plate.

{Example Batteries A21 to A25}

970 g of alumina having a median diameter 0.3 μm, 375 g of a polyacrylonitrile-modified rubber binder BM-720H manufactured by Zeon Corporation (solid matter content: 8 mass %) and a suitable amount of NMP were mixed in a double-shaft blender, to give a paste for forming an insulation layer. Example batteries A21 to A25 were prepared in a similar manner to Example batteries A1 to A5, except that an insulation layer having an alumina content of 97 mass % was formed on both faces of the negative electrode plate as the paste was coated and dried on both faces of the negative electrode plate to a thickness of 5 μm.

{Example Batteries A26 to A28}

Example batteries A26 to A28 were prepared in a similar manner to Example battery A21, except that insulation layers having an alumina content of 90 mass %, 70 mass %, and 50 mass % were prepared, respectively instead of the insulation layer having an alumina content of 97 mass %.

{Example Battery A29}

A paste for forming an insulation layer having an alumina content of 97 mass %, similar to the paste used for Example battery A21, was prepared. The paste was coated and dried on both faces of an aluminum current collector to a thickness of 5 μm, to give an aluminum current collector carrying insulation layers having an alumina content of 97 mass % formed on both faces. Example battery A29 was prepared in a similar manner to Example battery A1, except that the aluminum current collector carrying the insulation layer formed on both faces was used as the aluminum current collector in preparation of the positive electrode plate.

{Example Batteries A30 to A32}

Example batteries A30 to A32 were prepared in a similar manner to Example battery A29, except that an aluminum current collector carrying an insulation layers having an alumina content 90 mass %, 70 mass %, or 50 mass % formed on both faces was used, replacing the insulation layer having an alumina content of 97 mass %.

{Example Batteries A33 to A36}

Example batteries A33 to A36 were prepared in a similar manner to Example battery A21, except that an aluminum current collector having an insulation layer formed on both faces similar to that prepared for Example batteries A29 to 32 was used as the plate aluminum current collector in preparation of the positive electrode.

{Example Battery A37}

Example battery A37 was prepared in a similar manner to Example battery A1, except that 8 parts by mass of PVDF added, instead of 3 parts by mass of PVDF, with respect to 100 parts by mass of the lithium composite oxide in preparation of the positive electrode plate.

{Example Battery A38}

Example battery A38 was prepared in a similar manner to Example battery A1, except that 25 parts by mass of alumina was added, instead of 2 parts by mass of alumina, with respect to 100 parts by mass of the lithium composite oxide in preparation of the positive electrode plate.

{Example Battery A39}

Example battery A39 was prepared in a similar manner to Example battery A1, except that a separator having a heat-resistant porous insulation layer was used as the separator used in assembling the battery.

The separator carrying the heat-resistant porous insulation layer was prepared in the following manner:

200 g of an aramide resin (KEVLAR (3-mm cut fiber), manufactured by Du Pont-Toray Co., Ltd.) was dissolved uniformly in 800 g of N-methylpyrrolidone at 80° C., and 10 g of lithium chloride powder (manufactured by Kanto Kagaku Co. Inc.) was added and dissolved therein while the solution was agitated thoroughly, to give a solution for forming a heat-resistant porous insulation layer. The solution obtained was coated on a 25-μm polyethylene-polypropylene composite film previously heated to 60° C. (2300 manufactured by Celgard Co., Ltd.) with a bar coater having a clearance of 100 μm, and dried at 110° C. for 3 hours, to give a white film. The white film was immersed in a hot distilled water bath at 60° C. for 2 hours for removal of lithium chloride, to give a heat-resistant porous insulation layer. Subsequent washing with pure water gave a film having a heat-resistant porous insulation layer. The thickness of the heat-resistant porous insulation layer-carrying separator was 30 µm.

{Comparative Example Battery A101}

Comparative Example battery A101 was prepared in a similar manner to Example battery A1, except that 5 parts by mass of acetylene black was added, instead of 2 parts by mass of acetylene black, with respect to 100 parts by mass of the lithium composite oxide in preparation of the positive electrode plate.

{Comparative Example battery A102}

Comparative Example battery A102 was prepared in a similar manner to Example battery A1, except that no PVDF was added in preparation of the positive electrode plate.

{Comparative Example Battery A103}

Comparative Example battery A103 was prepared in a similar manner to Example battery A1, except that 1 part by mass of alumina was added, instead of 2 parts by mass of alumina, with respect to 100 parts by mass of the lithium composite oxide in preparation of the positive electrode plate.

{Comparative Example Battery A104}

Comparative Example battery A104 was prepared in a similar manner to Example battery A5, except that no alumina was added in preparation of the positive electrode plate.

{Example Battery B1}

(Preparation of Lithium Composite Oxide II)

Nickel sulfate, cobalt sulfate and aluminum sulfate were mixed at a Ni atom/Co atom/Al atom molar ratio of 78:20:2. 3200 g of the mixture obtained was dissolved in 10 L of water, to give a raw solution. 400 g of sodium hydroxide was added to the raw solution for inducing precipitation. The precipitate was washed thoroughly with water and then dried, to give a Ni—Co—Al coprecipitated hydroxide.

784 g of lithium hydroxide was mixed with 3000 g of the Ni—Co—Al coprecipitated hydroxide obtained, and the mixture was baked under an atmosphere at a partial oxygen pressure of 0.5 atmospheric pressure at a temperature of 750° C. for 10 hours, to give a lithium composite oxide II ($Li_{1.03}Ni_{0.78}Co_{0.20}Al_{0.02}O_2$).

(Preparation of Example Battery B1)

Example battery B1 was prepared in a similar manner to Example battery A1, except that, in preparation of the positive electrode plate, the lithium composite oxide I was replaced with the lithium composite oxide II, 5 parts by mass of acetylene black was added, instead of 2 parts by mass of acetylene black, with respect to 100 parts by mass of the lithium composite oxide, and 1 part by mass of alumina was added, instead of 2 parts by mass of alumina, with respect to 100 parts by mass of the lithium composite oxide.

{Example Battery B2}

Example battery B2 was prepared in a similar manner to Example battery B1, except that no acetylene black was added in preparation of the positive electrode plate.

{Example Battery B3}

Example battery B3 was prepared in a similar manner to Example battery B2, except that no alumina was addition in preparation of the positive electrode plate.

{Example Battery B4}

Example battery B4 was prepared in a similar manner to Example battery B1, except that 42 g (approximately 0.5 parts by mass with respect to 100 parts by mass of the lithium composite oxide) of PVDF #1320 was used instead of 250 g (3 parts by mass of PVDF) in preparation of the positive electrode plate.

{Example Battery B5}

Example battery B5 was prepared in a similar manner to Example battery B1, except that 583 g of PVDF #1320 (approximately 7 parts by mass of PVDF with respect to 100 parts by mass of the lithium composite oxide) was used instead of 250 g of PVDF #1320 in preparation of the positive electrode plate.

{Example Battery B6 to B10}

Example batteries B6 to B10 were prepared in a similar manner to Example batteries B1 to B5, except that the aluminum current collector carrying a positive electrode mixture was roll-pressed once with roller having a clearance of 5 µm, instead of thrice with rolls having a clearance of 15 µm, to give a positive electrode plate having a total thickness of 160 µm in preparation of the positive electrode plate.

{Example Batteries B11 to B15}

Example batteries B11 to B15 were prepared in a similar manner to Example batteries B1 to B5, except that the aluminum current collector carrying a positive electrode mixture was softened in air at 200° C. for 5 hours and then roll pressed in preparation of the positive electrode plate.

{Example Batteries B16 to B20}

Example batteries B16 to B20 were prepared in a similar manner to Example batteries B1 to B5, except that the aluminum current collector carrying a positive electrode mixture was softened in air at 300° C. for 5 hours and then roll-pressed in preparation of the positive electrode plate.

{Example Battery B21 to B25}

970 g of alumina having a median diameter 0.3 µm, 375 g of a polyacrylonitrile-modified rubber binder BM-720H manufactured by Zeon Corporation (solid matter content: 8 mass %) and a suitable amount of NMP were mixed in a double-shaft blender, to give a paste for forming an insulation layer. Example batteries B21 to B25 were prepared in a similar manner to Example batteries B1 to B5, except that an insulation layer having an alumina content of 97 mass % was formed on both faces of the negative electrode plate as the paste was coated and dried on both faces of the negative electrode plate to a thickness of 5 µm.

{Example Batteries B26 to B28}

Example batteries B26 to B28 were prepared in a similar manner to Example battery B21, except that insulation layers having an alumina content of 90 mass %, 70 mass %, and 50 mass % were prepared, instead of an insulation layer having an alumina content of 97 mass % being formed.

{Example Battery B29 to B32}

Example batteries B29 to B32 were prepared in a similar manner to Example battery B1, except that an aluminum current collector having an insulation layer formed on both faces similar to that prepared for Example batteries A29 to A32 was used as the aluminum current collector in preparation of the positive electrode.

{Example Batteries B33 to B36}

Example batteries B33 to 36 were prepared in a similar manner to Example batteries B21 and B26 to B28, except that an aluminum current collector having an insulation layer formed on both faces similar to that prepared for Example batteries A29 to A32 was used as the aluminum current collector in preparation of the positive electrode.

{Example Battery B37}

Example battery B37 was prepared in a similar manner to Example battery B1, except that 8 parts by mass of PVDF added, instead of 3 parts by mass of PVDF, with respect to 100 parts by mass of the lithium composite oxide in preparation of the positive electrode plate.

{Example Battery B38}

Example battery B38 was prepared in a similar manner to Example battery B1, except that 5 parts by mass of alumina was added, instead of 1 part by mass of alumina, with respect to 100 parts by mass of the lithium composite oxide in preparation of the positive electrode plate.

{Example Battery B39}

Example battery B39 was prepared in a similar manner to Example battery B1, except that a separator having a heat-resistant porous insulation layer similar to that used in Example battery A39 was used as the separator used in assembling the battery.

{Comparative Example Battery B101}

Comparative Example battery B101 was prepared in a similar manner to Example battery B1, except that 7 parts by mass of acetylene black was added, instead of 5 parts by mass of acetylene black, with respect to 100 parts by mass of the lithium composite oxide in preparation of the positive electrode plate.

{Comparative Example Battery B102}

Comparative Example battery B102 was prepared in a similar manner to Example battery B1, except that no PVDF was added in preparation of the positive electrode plate.

{Example Batteries C1 to C39 and Comparative Example Batteries C101 to C102}

(Preparation of Lithium Composite Oxide III)

Nickel sulfate, cobalt sulfate and magnesium sulfate were mixed at a Ni atom/Co atom/Mg atom molar ratio of 78:20:2. 3200 g of the mixture obtained was dissolved in 10 L of water, to give a raw solution. 400 g of sodium hydroxide was added to the raw solution for inducing precipitation. The precipitate was washed thoroughly with water and then dried, to give a Ni—Co—Mg coprecipitated hydroxide.

784 g of lithium hydroxide was mixed with 3000 g of the Ni—Co—Mg coprecipitated hydroxide obtained, and the mixture was baked under an atmosphere at a partial oxygen pressure of 0.5 atmospheric pressure and at a temperature of 750° C. for 10 hours, to give a lithium composite oxide I ($Li_{1.03}Ni_{0.78}Co_{0.20}Mg_{0.02}O_2$).

(Preparation of Example batteries C1 to C39 and Comparative Example batteries C101 to C102)

Example batteries C1 to C39 and Comparative Example batteries C101 to C102 were prepared respectively, similarly to Example batteries B1 to B39 and Comparative Example batteries B101 to B102, except that the lithium composite oxide III was used replacing the lithium composite oxide II in preparation of the positive electrode plate.

{Example Batteries D1 to D39 and Comparative Example Batteries D101 to D102}

(Preparation of Lithium Composite Oxide III)

Nickel sulfate, cobalt sulfate and manganese sulfate were mixed at a Ni atom/Co atom/Mn atom molar ratio of 33:33:33. 3200 g of the mixture obtained was dissolved in 10 L of water, to give a raw solution. 400 g of sodium hydroxide was added to the raw solution for inducing precipitation. The precipitate was washed thoroughly with water and then dried, to give a Ni—Co—Mn coprecipitated hydroxide.

784 g of lithium hydroxide was mixed with 3000 g of the Ni—Co—Mn coprecipitated hydroxide obtained, and the mixture was baked under an atmosphere at a partial oxygen pressure of 0.5 atmospheric pressure and at a temperature of 750° C. for 10 hours, to give a lithium composite oxide ($Li_{1.03}Ni_{0.33}Co_{0.33}Mn_{0.33}O_2$).

(Preparation of Example batteries D1 to D39 and Comparative Example batteries D101 to D102)

Example batteries D1 to D39 and Comparative Example batteries D101 to D102 were prepared respectively, similarly to Example batteries B1 to B39 and Comparative Example batteries B101 to B102, except that the lithium composite oxide III was used replacing the lithium composite oxide II in preparation of the positive electrode plate.

{Example Batteries E1 to E39 and Comparative Example Batteries E101 to E102}

(Preparation of Lithium Composite Oxide IV)

Nickel sulfate, cobalt sulfate and aluminum sulfate were mixed at a Ni atom/Co atom/Al atom molar ratio of 78:20:2. 3200 g of the mixture obtained was dissolved in 10 L of water, to give a raw solution. 400 g of sodium hydroxide was added to the raw solution for inducing precipitation. The precipitate was washed thoroughly with water and then dried, to give a Ni—Co—Al coprecipitated hydroxide.

784 g of lithium hydroxide was mixed with 3000 g of the Ni—Co—Al coprecipitated hydroxide obtained, and the mixture was baked under an atmosphere at a partial oxygen pressure of 0.5 atmospheric pressure and at a temperature of 750° C. for 10 hours, to give a lithium composite oxide ($Li_{1.03}Ni_{0.78}Co_{0.20}Al_{0.02}O_2$).

2000 g of the lithium composite oxide obtained was dispersed in 1 L of an aqueous sodium hydroxide aqueous solution at pH 13; an aqueous solution of manganese acetate (Mn) in an amount of 1.0 mol % with respect to the lithium composite oxide dissolved in 100 g of distilled water was added dropwise over 10 minutes; the mixture was then stirred at 100° C. for 3 hours and then filtered; and the residue was dried at 100° C. for 2 hours, to give a lithium composite oxide IV supporting Mn on the surface. Presence of Mn on the surface of the lithium composite oxide IV was confirmed by EMPA analysis of active material particle cross section, elemental mapping, XPS, EMPA, ICP emission spectroscopy, and others. Presence thereof on the lithium composite oxide surface was confirmed similarly in the following Examples.

(Preparation of Example batteries E1 to E39 and Comparative Example batteries E101 to E102)

Example batteries E1 to E39 and Comparative Example batteries E101 to E102 were prepared respectively, similarly to Example batteries B1 to 39 and Comparative Example batteries B101 to B102, except that the lithium composite oxide IV was used replacing the lithium composite oxide II in preparation of the positive electrode plate.

{Example Batteries F1 to F39 and Comparative Example Batteries F101 to 102}

Example batteries F1 to F39 and Comparative Example batteries F101 to F102 were prepared respectively, similarly to Example batteries E1 to E39 and Comparative Example batteries E101 to E102, except that the lithium composite oxide IV carrying manganese acetate (Mn)-derived Mn was replaced with the lithium composite oxide V carrying aluminum sulfate (Al)-derived aluminum (Al) on the surface.

{Example Batteries G1 to G39 and Comparative Example Batteries G101 to G102}

Example batteries G1 to G39 and Comparative Example batteries G101 to G102 were prepared respectively, similarly to Example batteries E1 to E39 and Comparative Example batteries E101 to E102, except that the lithium composite oxide V supporting magnesium acetate-derived magnesium (Mg) on the surface was used replacing the lithium oxide IV supporting manganese acetate-derived Mn on the surface.

{Example Battery H1}

Example battery H1 was prepared in a similar manner to Example battery A1, except that no alumina was added in preparation of the positive electrode plate and $SiO_{0.3}$ was used, replacing the synthetic graphite, as the anode material in preparation of the negative electrode plate.

{Example Battery H2}

Example battery H2 was prepared in a similar manner to Example battery A1, except that no alumina was addition in preparation of the positive electrode plate and $SiO_{1.3}$ was used as the anode material, replacing the synthetic graphite, in preparation of the negative electrode plate.

{Example Battery H3}

Example battery H3 was prepared in a similar manner to Example battery A1, except that no alumina was added in preparation of the positive electrode plate and $SnO_{0.3}$ was used as the anode material, replacing the synthetic graphite, in preparation of the negative electrode plate.

{Example Battery H4}

Example battery H4 was prepared in a similar manner to Example battery A1, except that no alumina was added in preparation of the positive electrode plate and $SnO_{1.3}$ was used replacing the synthetic graphite as the anode material in preparation of the negative electrode plate.

{Comparative Example Battery H101}

Comparative Example battery H101 was prepared in a similar manner to Example battery A1, except that no alumina was addition in preparation of the positive electrode plate.

[Evaluation]

Each of the batteries thus obtained was evaluated by the following methods.

(Rate of the Cathode Material Embedded in the Positive Electrode Current Collector)

A positive electrode plate was impregnated with a resin and hardened. Specifically, a positive electrode plate was immersed in a resin adhesive (HARDENER) manufactured by Nagase Chemtex Co., Ltd. and the resin was hardened with the positive electrode plate, after deaeration under reduced pressure. Then, the current collector region having the mixture coated on both faces was cut vertically to the electrode face; the cross section thus obtained was polished; and five different SEM images of the cross section were obtained by observation under SEM. The magnification of the SEM image was 1000 times.

The interface between the positive electrode mixture layer and the positive electrode current collector in the five SEM images obtained was observed over a range of 100 μm, and an approximate straight line of a length L of 100 μm was drawn in the SEM images from the line segments not forming the dents on the positive electrode current collector surface. Then, the total length of the line segments uncleaved by the dents ΔL (unit: μm) in the approximate line was determined, and the dent area rate (%) was determined by the Formula: 100×ΔL/L.

(Electrode Plate Resistance in Charged State)

As shown in FIG. 2, a copper plate (20×20×20 mm) and an electrode plate of 20×20 mm in size cut off from a full-charged battery were laminated to each other and the electrode plate resistance were measured by direct-current 4-terminal method using an ohm meter (digital-multimeter, model 3457A: manufactured by HEWLETT PACKARD). In measurement, the sample was pressurized under 50 kg/cm² for 30 seconds before the data were read. The measured value obtained was converted to a standardized value per cm², to give a resistance of the electrode plate. It is previously known that the batteries of the Examples and Comparative Examples have, at a charge rate in the range of 10% or more, a resistance equivalent to or more than that of the electrode plates at full charge.

(Discharge Characteristics)

Each battery was charged after two preliminary charge/discharge cycles and stored under an environment at 40° C. for 2 days. Subsequently, each battery was charged and discharged in the following two patterns. However, the designed capacity of the battery was 2000 mAh.

First Pattern (1) Constant current charge (20° C.): 1400 mA <0.7 CmA> (end voltage: 4.2 V)

(2) Constant voltage charge (20° C.): 4.2 V (end current: 0.05 CmA)

(3) Constant current discharge (0° C.): 400 mA <0.2 CmA>(end voltage: 3 V)

Second Pattern (1) Constant current charge (20° C.): 1400 mA <0.7 CmA> (end voltage: 4.2 V)

(2) Constant voltage charge (20° C.): 4.2 V (end current: 100 mA)

(3) Constant current discharge (0° C.): 4000 mA <2 CmA> (end voltage: 3 V)

The discharge capacities determined in the first and second patterns are shown in Tables 1 to 8.

(Nail Penetration Test)

The battery nail penetration test was carried out under an environment at 60° C. First, the battery after measurement of its discharge characteristics was charged as described below under an environment at 20° C. However, the designed capacity of the battery was 2000 mAh.

(1) Constant current charge: 1400 mA <0.7 CmA>(end voltage: 4.25 V)

(2) Constant voltage charge: 4.25 V (end current: 100 mA)

Under an environment at 60° C., an iron nail having a diameter of 3 mm was pushed inward through the side wall into a battery at full charge at a velocity of 1 mm/second for short circuiting of the battery. The maximum reachable temperature at the nail-inserted region of each battery after 90 second is shown in Tables 1 to 8.

TABLE 1

| BATTERY NO. | COMPOSITION POSITIVE ELECTRODE MIXTURE LAYER (PARTS BY MASS) | | | | ROLLING CONDITION ROLLER CLEARANCE (μm) AND ROLLING NUMBER | CORE MATERIAL-SOFTENING CONDITION | ELECTRODE-PLATE INSULATION LAYER | | |
|---|---|---|---|---|---|---|---|---|---|
| | LITHIUM COMPOSITE OXIDE | ACETYLENE BLACK | PVDF | ALUMINA | | | REGION FORMED | ALUMINA CONTENT (MASS %) | BINDER |
| A1 | $Li_{1.03}Ni_{0.80}Co_{0.2}O_2$ (100 PARTS BY MASS) | 2 | 3 | 2 | 15 μm, THRICE | — | — | | |
| A2 | | 0 | | | | | | | |
| A3 | | 2 | | 20 | | | | | |
| A4 | | | 0.5 | 2 | | | | | |
| A5 | | | 7 | | | | | | |
| A6 | | 2 | 3 | 2 | 5 μm, ONCE | | | | |
| A7 | | 0 | | | | | | | |
| A8 | | 2 | | 20 | | | | | |
| A9 | | | 0.5 | 2 | | | | | |
| A10 | | | 7 | | | | | | |

TABLE 1-continued

| Battery No. | Col 1 | Col 2 | Col 3 | Col 4 | Col 5 | Col 6 | Col 7 |
|---|---|---|---|---|---|---|---|
| A11 | 2 | 3 | 2 | 15 μm, THRICE | 200° C., 5 HOURS | | |
| A12 | 0 | | | | | | |
| A13 | 2 | | 20 | | | | |
| A14 | | 0.5 | 2 | | | | |
| A15 | | 7 | | | | | |
| A16 | 2 | 3 | 2 | | 300° C., 5 HOURS | | |
| A17 | 0 | | | | | | |
| A18 | 2 | | 20 | | | | |
| A19 | | 0.5 | 2 | | | | |
| A20 | | 7 | | | | | |
| A21 | 2 | 3 | 2 | — | POROUS INSULATION LAYER ON NEGATIVE ELECTRODE PLATE | 97 | BM-720H |
| A22 | 0 | | | | | | |
| A23 | 2 | | 20 | | | | |
| A24 | | 0.5 | 2 | | | | |
| A25 | | 7 | | | | | |
| A26 | 2 | 3 | 2 | | | 90 | |
| A27 | | | | | | 70 | |
| A28 | | | | | | 50 | |
| A29 | | | | | ONLY ON POSITIVE ELECTRODE CORE MATERIAL | 97 | |
| A30 | | | | | | 90 | |
| A31 | | | | | | 70 | |
| A32 | | | | | | 50 | |
| A33 | | | | | BOTH ON NEGATIVE ELECTRODE PLATE AND POSITIVE ELECTRODE CORE MATERIAL | 97 | |
| A34 | | | | | | 90 | |
| A35 | | | | | | 70 | |
| A36 | | | | | | 50 | |
| A37 | | 8 | | | — | — | — |
| A38 | | 3 | 25 | | | | |
| A39 | | | 2 | | | | |
| A101 | 5 | | 2 | | | | |
| A102 | 2 | 0 | | | | | |
| A103 | | 3 | 1 | | | | |
| A104 | 2 | 7 | 0 | | | | |

| BATTERY NO. | PRESENCE OF HEAT-RESISTANT INSULATION LAYER ON SEPARATOR | RATE OF POSITIVE ELECTRODE ACTIVE MATERIAL EMBEDDED IN POSITIVE ELECTRODE CORE MATERIAL (%) | POSITIVE ELECTRODE PLATE RESISTANCE ($\Omega \cdot cm^2$) | NEGATIVE ELECTRODE PLATE RESISTANCE ($\Omega \cdot cm^2$) | DISCHARGE CHARACTERISTICS (mAh, 0° C.) 400 mA | DISCHARGE CHARACTERISTICS (mAh, 0° C.) 4000 mA | NAIL PENETRATION TEST MAXIMUM REACHABLE TEMPERATURE (° C.) |
|---|---|---|---|---|---|---|---|
| A1 | — | 5 | 0.40 | 0.05 | 1982 | 1901 | 79 |
| A2 | | 3 | 0.50 | | 1984 | 1890 | 77 |
| A3 | | 2 | 0.50 | | 1952 | 1902 | 79 |
| A4 | | 5 | 0.45 | | 1989 | 1904 | 75 |
| A5 | | 4 | 0.40 | | 1987 | 1820 | 77 |
| A6 | | 7 | 0.60 | | 1992 | 1909 | 62 |
| A7 | | 6 | 0.55 | | 1991 | 1901 | 60 |
| A8 | | 7 | 0.50 | | 1970 | 1899 | 61 |
| A9 | | 8 | 0.65 | | 1992 | 1900 | 62 |
| A10 | | 8 | 0.60 | | 1988 | 1840 | 60 |
| A11 | | 15 | 0.70 | | 1990 | 1902 | 54 |
| A12 | | 17 | 0.55 | | 1990 | 1901 | 55 |
| A13 | | 18 | 0.80 | | 1982 | 1902 | 50 |
| A14 | | 15 | 0.60 | | 1994 | 1902 | 55 |
| A15 | | 17 | 0.70 | | 1990 | 1820 | 52 |
| A16 | | 20 | 0.60 | | 1982 | 1904 | 50 |
| A17 | | 22 | 0.50 | | 1988 | 1902 | 50 |
| A18 | | 24 | 0.75 | | 1950 | 1904 | 52 |
| A19 | | 22 | 0.65 | | 1991 | 1906 | 51 |
| A20 | | 20 | 0.65 | | 1985 | 1860 | 55 |
| A21 | | 5 | 0.40 | $2 \times 10^{12}$ | 1980 | 1902 | 60 |
| A22 | | 3 | 0.50 | | 1982 | 1900 | 62 |
| A23 | | 2 | 0.50 | | 1962 | 1880 | 61 |
| A24 | | 5 | 0.45 | | 1985 | 1900 | 65 |
| A25 | | 4 | 0.40 | | 1978 | 1850 | 64 |
| A26 | | 4 | 0.40 | $1 \times 10^{12}$ | 1983 | 1892 | 61 |
| A27 | | 4 | 0.40 | $5 \times 10^{11}$ | 1982 | 1899 | 60 |
| A28 | | 4 | 0.40 | $4 \times 10^{10}$ | 1980 | 1897 | 65 |
| A29 | | 4 | 0.75 | 0.05 | 1985 | 1897 | 61 |
| A30 | | 4 | 0.70 | | 1982 | 1898 | 61 |
| A31 | | 4 | 0.65 | | 1981 | 1897 | 65 |
| A32 | | 4 | 0.60 | | 1980 | 1899 | 62 |
| A33 | | 4 | 0.75 | $2 \times 10^{12}$ | 1982 | 1895 | 62 |

TABLE 1-continued

| | | | | | | | |
|---|---|---|---|---|---|---|---|
| A34 | | 4 | 0.70 | $1 \times 10^{12}$ | 1981 | 1892 | 61 |
| A35 | | 4 | 0.65 | $5 \times 10^{11}$ | 1980 | 1892 | 64 |
| A36 | | 4 | 0.60 | $4 \times 10^{10}$ | 1982 | 1897 | 60 |
| A37 | | 2 | 0.50 | 0.05 | 1975 | 1780 | 67 |
| A38 | | 2 | 0.82 | | 1917 | 1720 | 62 |
| A39 | YES | 5 | 0.40 | | 1980 | 1880 | 70 |
| A101 | — | 3 | 0.30 | | 1978 | 1899 | 118 |
| A102 | | 5 | 0.35 | | 1988 | 1850 | 100 |
| A103 | | 5 | 0.35 | | 1992 | 1899 | 115 |
| A104 | | 5 | 0.30 | | 1995 | 1900 | 120 |

TABLE 2

| BATTERY NO. | COMPOSITION POSITIVE ELECTRODE MIXTURE LAYER (PARTS BY MASS) | | | | ROLLING CONDITION ROLLER CLEARANCE (µm) AND ROLLING NUMBER | CORE MATERIAL-SOFTENING CONDITION | ELECTRODE-PLATE INSULATION LAYER | | |
|---|---|---|---|---|---|---|---|---|---|
| | LITHIUM COMPOSITE OXIDE | ACETYLENE BLACK | PVDF | ALUMINA | | | REGION FORMED | ALUMINA CONTENT (MASS %) | BINDER |
| B1 | Li$_{1.03}$Ni$_{0.780}$Co$_{0.2}$Al$_{0.02}$O$_2$ | 5 | 3 | 1 | 15 µm, THRICE | — | — | — | — |
| B2 | (100 PARTS BY MASS) | 0 | | | | | | | |
| B3 | | | | 0 | | | | | |
| B4 | | 5 | 0.5 | 1 | | | | | |
| B5 | | | 7 | | | | | | |
| B6 | | 5 | 3 | 1 | 5 µm, ONCE | | | | |
| B7 | | 0 | | | | | | | |
| B8 | | | | 0 | | | | | |
| B9 | | 5 | 0.5 | 1 | | | | | |
| B10 | | | 7 | | | | | | |
| B11 | | 5 | 3 | 1 | 15 µm, THRICE | 200° C., 5 HOURS | | | |
| B12 | | 0 | | | | | | | |
| B13 | | | | 0 | | | | | |
| B14 | | 5 | 0.5 | 1 | | | | | |
| B15 | | | 7 | | | | | | |
| B16 | | 5 | 3 | 1 | | 300° C., 5 HOURS | | | |
| B17 | | 0 | | | | | | | |
| B18 | | | | 0 | | | | | |
| B19 | | 5 | 0.5 | 1 | | | | | |
| B20 | | | 7 | | | | | | |
| B21 | | 5 | 3 | 1 | | — | POROUS INSULATION LAYER ON NEGATIVE ELECTRODE PLATE | 97 | BM-720H |
| B22 | | 0 | | | | | | | |
| B23 | | | | 0 | | | | | |
| B24 | | 5 | 0.5 | 1 | | | | | |
| B25 | | | 7 | | | | | | |
| B26 | | 5 | 3 | 1 | | | | 90 | |
| B27 | | | | | | | | 70 | |
| B28 | | | | | | | | 50 | |
| B29 | | | | | | | ONLY ON POSITIVE ELECTRODE CORE MATERIAL | 97 | |
| B30 | | | | | | | | 90 | |
| B31 | | | | | | | | 70 | |
| B32 | | | | | | | | 50 | |
| B33 | | | | | | | BOTH ON NEGATIVE ELECTRODE PLATE AND POSITIVE ELECTRODE CORE MATERIAL | 97 | |
| B34 | | | | | | | | 90 | |
| B35 | | | | | | | | 70 | |
| B36 | | | | | | | | 50 | |
| B37 | | | 8 | | | — | — | — | — |
| B38 | | | 3 | 5 | | | | | |
| B39 | | | | 1 | | | | | |
| B101 | | 7 | | | | | | | |
| B102 | | 5 | 0 | | | | | | |

TABLE 2-continued

| BATTERY NO. | PRESENCE OF HEAT-RESISTANT INSULATION LAYER ON SEPARATOR | RATE OF POSITIVE ELECTRODE ACTIVE MATERIAL EMBEDDED IN POSITIVE ELECTRODE CORE MATERIAL (%) | POSITIVE ELECTRODE PLATE RESISTANCE ($\Omega \cdot cm^2$) | NEGATIVE ELECTRODE PLATE RESISTANCE ($\Omega \cdot cm^2$) | DISCHARGE CHARACTERISTICS (mAh, 0° C.) 400 mA | DISCHARGE CHARACTERISTICS (mAh, 0° C.) 4000 mA | NAIL PENETRATION TEST MAXIMUM REACHABLE TEMPERATURE (° C.) |
|---|---|---|---|---|---|---|---|
| B1 | — | 4 | 0.50 | 0.05 | 1991 | 1902 | 69 |
| B2 | | 5 | 0.65 | | 1992 | 1892 | 70 |
| B3 | | 3 | 0.60 | | 1990 | 1901 | 72 |
| B4 | | 4 | 0.45 | | 1992 | 1900 | 74 |
| B5 | | 3 | 0.50 | | 1988 | 1895 | 69 |
| B6 | | 8 | 0.65 | | 1990 | 1901 | 70 |
| B7 | | 7 | 0.65 | | 1992 | 1902 | 70 |
| B8 | | 7 | 0.55 | | 1990 | 1904 | 68 |
| B9 | | 5 | 0.70 | | 1990 | 1902 | 72 |
| B10 | | 5 | 0.55 | | 1985 | 1892 | 72 |
| B11 | | 12 | 0.75 | | 1989 | 1901 | 77 |
| B12 | | 15 | 0.65 | | 1990 | 1902 | 70 |
| B13 | | 17 | 0.60 | | 1992 | 1904 | 68 |
| B14 | | 18 | 0.70 | | 1990 | 1904 | 72 |
| B15 | | 15 | 0.65 | | 1985 | 1890 | 70 |
| B16 | | 22 | 0.70 | | 1990 | 1900 | 71 |
| B17 | | 25 | 0.65 | | 1992 | 1901 | 72 |
| B18 | | 24 | 0.60 | | 1991 | 1899 | 71 |
| B19 | | 26 | 0.70 | | 1991 | 1902 | 71 |
| B20 | | 27 | 0.75 | | 1984 | 1890 | 71 |
| B21 | | 4 | 0.50 | $2 \times 10^{12}$ | 1992 | 1900 | 70 |
| B22 | | 5 | 0.65 | | 1990 | 1901 | 71 |
| B23 | | 3 | 0.60 | | 1993 | 1902 | 71 |
| B24 | | 4 | 0.45 | | 1990 | 1904 | 68 |
| B25 | | 3 | 0.50 | | 1984 | 1892 | 68 |
| B26 | | 4 | 0.50 | $1 \times 10^{12}$ | 1992 | 1904 | 70 |
| B27 | | 4 | 0.50 | $5 \times 10^{11}$ | 1992 | 1905 | 70 |
| B28 | | 4 | 0.50 | $4 \times 10^{10}$ | 1994 | 1902 | 75 |
| B29 | | 4 | 0.80 | 0.05 | 1990 | 1904 | 70 |
| B30 | | 4 | 0.75 | | 1991 | 1902 | 69 |
| B31 | | 4 | 0.70 | | 1990 | 1900 | 77 |
| B32 | | 4 | 0.70 | | 1991 | 1900 | 71 |
| B33 | | 4 | 0.80 | $2 \times 10^{12}$ | 1990 | 1901 | 72 |
| B34 | | 4 | 0.75 | $1 \times 10^{12}$ | 1994 | 1902 | 75 |
| B35 | | 4 | 0.70 | $5 \times 10^{11}$ | 1990 | 1900 | 72 |
| B36 | | 4 | 0.70 | $4 \times 10^{10}$ | 1991 | 1905 | 71 |
| B37 | | 3 | 0.55 | 0.05 | 1972 | 1820 | 70 |
| B38 | | 4 | 0.40 | | 1970 | 1845 | 68 |
| B39 | YES | 4 | 0.45 | | 1990 | 1900 | 71 |
| B101 | — | 4 | 0.35 | | 1990 | 1902 | 115 |
| B102 | | 4 | 0.30 | | 1991 | 1825 | 110 |

TABLE 3

| BATTERY NO. | COMPOSITION POSITIVE ELECTRODE MIXTURE LAYER (PARTS BY MASS) LITHIUM COMPOSITE OXIDE | COMPOSITION POSITIVE ELECTRODE MIXTURE LAYER (PARTS BY MASS) ACETYLENE BLACK | COMPOSITION POSITIVE ELECTRODE MIXTURE LAYER (PARTS BY MASS) PVDF | COMPOSITION POSITIVE ELECTRODE MIXTURE LAYER (PARTS BY MASS) ALUMINA | ROLLING CONDITION ROLLER CLEARANCE (µm) AND ROLLING NUMBER | CORE MATERIAL-SOFTENING CONDITION | ELECTRODE-PLATE INSULATION LAYER REGION FORMED | ELECTRODE-PLATE INSULATION LAYER ALUMINA CONTENT (MASS %) | ELECTRODE-PLATE INSULATION LAYER BINDER |
|---|---|---|---|---|---|---|---|---|---|
| C1 | Li$_{1.03}$Ni$_{0.780}$Co$_{0.2}$Mg$_{0.02}$O$_2$ | 5 | 3 | 1 | 15 µm, THRICE | — | — | — | — |
| C2 | (100 PARTS | 0 | | | | | | | |
| C3 | BY MASS) | | | 0 | | | | | |
| C4 | | 5 | 0.5 | 1 | | | | | |
| C5 | | | 7 | | | | | | |
| C6 | | 5 | 3 | 1 | 5 µm, ONCE | | | | |
| C7 | | 0 | | | | | | | |
| C8 | | | | 0 | | | | | |
| C9 | | 5 | 0.5 | 1 | | | | | |
| C10 | | | 7 | | | | | | |
| C11 | | 5 | 3 | 1 | 15 µm, THRICE | 200° C., 5 HOURS | | | |
| C12 | | 0 | | | | | | | |
| C13 | | | | 0 | | | | | |
| C14 | | 5 | 0.5 | 1 | | | | | |
| C15 | | | 7 | | | | | | |

TABLE 3-continued

| | | | | | | | | |
|---|---|---|---|---|---|---|---|---|
| C16 | | 5 | 3 | 1 | 300° C., 5 HOURS | | | |
| C17 | | 0 | | | | | | |
| C18 | | | | 0 | | | | |
| C19 | | 5 | 0.5 | 1 | | | | |
| C20 | | | 7 | | | | | |
| C21 | | 5 | 3 | 1 | — | POROUS INSULATION LAYER ON NEGATIVE ELECTRODE PLATE | 97 | BM-720H |
| C22 | | 0 | | | | | | |
| C23 | | | | 0 | | | | |
| C24 | | 5 | 0.5 | 1 | | | | |
| C25 | | | 7 | | | | | |
| C26 | | 5 | 3 | 1 | | | 90 | |
| C27 | | | | | | | 70 | |
| C28 | | | | | | | 50 | |
| C29 | | | | | | ONLY ON POSITIVE ELECTRODE CORE MATERIAL | 97 | |
| C30 | | | | | | | 90 | |
| C31 | | | | | | | 70 | |
| C32 | | | | | | | 50 | |
| C33 | | | | | | BOTH ON NEGATIVE ELECTRODE PLATE AND POSITIVE ELECTRODE CORE MATERIAL | 97 | |
| C34 | | | | | | | 90 | |
| C35 | | | | | | | 70 | |
| C36 | | | | | | | 50 | |
| C37 | | | 8 | | — | | — | — |
| C38 | | | 3 | 5 | | | | |
| C39 | | | | 1 | | | | |
| C101 | | 7 | | | | | | |
| C102 | | 5 | 0 | | | | | |

| BATTERY NO. | PRESENCE OF HEAT-RESISTANT INSULATION LAYER ON SEPARATOR | RATE OF POSITIVE ELECTRODE ACTIVE MATERIAL EMBEDDED IN POSITIVE ELECTRODE CORE MATERIAL (%) | POSITIVE ELECTRODE PLATE RESISTANCE ($\Omega \cdot cm^2$) | NEGATIVE ELECTRODE PLATE RESISTANCE ($\Omega \cdot cm^2$) | DISCHARGE CHARACTERISTICS (mAh, 0° C.) | | NAIL PENETRATION TEST MAXIMUM REACHABLE TEMPERATURE (° C.) |
|---|---|---|---|---|---|---|---|
| | | | | | 400 mA | 4000 mA | |
| C1 | — | 4 | 0.55 | 0.05 | 1980 | 1901 | 71 |
| C2 | | 5 | 0.50 | | 1982 | 1890 | 75 |
| C3 | | 4 | 0.60 | | 1989 | 1880 | 69 |
| C4 | | 4 | 0.50 | | 1988 | 1904 | 77 |
| C5 | | 4 | 0.65 | | 1950 | 1891 | 70 |
| C6 | | 7 | 0.50 | | 1990 | 1909 | 68 |
| C7 | | 4 | 0.50 | | 1990 | 1910 | 70 |
| C8 | | 5 | 0.60 | | 1991 | 1912 | 70 |
| C9 | | 7 | 0.55 | | 1991 | 1915 | 68 |
| C10 | | 7 | 0.60 | | 1920 | 1908 | 71 |
| C11 | | 15 | 0.80 | | 1982 | 1902 | 71 |
| C12 | | 18 | 0.55 | | 1991 | 1901 | 71 |
| C13 | | 15 | 0.60 | | 1992 | 1902 | 71 |
| C14 | | 15 | 0.70 | | 1990 | 1902 | 71 |
| C15 | | 20 | 0.70 | | 1945 | 1905 | 72 |
| C16 | | 25 | 0.65 | | 1985 | 1904 | 69 |
| C17 | | 25 | 0.55 | | 1989 | 1902 | 77 |
| C18 | | 24 | 0.60 | | 1981 | 1904 | 68 |
| C19 | | 29 | 0.60 | | 1990 | 1906 | 68 |
| C20 | | 28 | 0.65 | | 1942 | 1902 | 72 |
| C21 | | 4 | 0.55 | $2 \times 10^{12}$ | 1992 | 1905 | 74 |
| C22 | | 5 | 0.50 | | 1990 | 1904 | 72 |
| C23 | | 4 | 0.60 | | 1991 | 1910 | 70 |
| C24 | | 4 | 0.50 | | 1991 | 1900 | 72 |
| C25 | | 4 | 0.65 | | 1945 | 1900 | 70 |
| C26 | | 4 | 0.55 | $1 \times 10^{12}$ | 1987 | 1910 | 72 |
| C27 | | 4 | 0.55 | $5 \times 10^{11}$ | 1990 | 1915 | 70 |
| C28 | | 4 | 0.55 | $4 \times 10^{10}$ | 1994 | 1900 | 72 |
| C29 | | 4 | 0.85 | 0.05 | 1992 | 1902 | 70 |
| C30 | | 4 | 0.80 | | 1994 | 1899 | 70 |
| C31 | | 4 | 0.80 | | 1990 | 1898 | 71 |
| C32 | | 4 | 0.75 | | 1990 | 1900 | 71 |
| C33 | | 4 | 0.85 | $2 \times 10^{12}$ | 1991 | 1915 | 69 |
| C34 | | 4 | 0.80 | $1 \times 10^{12}$ | 1992 | 1910 | 70 |
| C35 | | 4 | 0.80 | $5 \times 10^{11}$ | 1987 | 1915 | 75 |
| C36 | | 4 | 0.75 | $4 \times 10^{10}$ | 1990 | 1912 | 72 |

TABLE 3-continued

| | | | | | | | |
|---|---|---|---|---|---|---|---|
| C37 | | 4 | 0.50 | 0.05 | 1900 | 1701 | 68 |
| C38 | | 4 | 0.40 | | 1902 | 1750 | 69 |
| C39 | YES | 4 | 0.40 | | 1930 | 1890 | 72 |
| C101 | — | 5 | 0.30 | | 1980 | 1901 | 120 |
| C102 | | 4 | 0.35 | | 1982 | 1840 | 107 |

TABLE 4

| BATTERY NO. | COMPOSITION POSITIVE ELECTRODE MIXTURE LAYER (PARTS BY MASS) | | | | ROLLING CONDITION ROLLER CLEARANCE (μm) AND ROLLING NUMBER | CORE MATERIAL-SOFTENING CONDITION | ELECTRODE-PLATE INSULATION LAYER | | |
|---|---|---|---|---|---|---|---|---|---|
| | LITHIUM COMPOSITE OXIDE | ACETYLENE BLACK | PVDF | ALUMINA | | | REGION FORMED | ALUMINA CONTENT (MASS %) | BINDER |
| D1 | Li$_{1.03}$Ni$_{0.330}$Co$_{0.33}$Mn$_{0.33}$O$_2$ (100 PARTS BY MASS) | 5 | 3 | 1 | 15 μm, THRICE | — | — | — | — |
| D2 | | 0 | | | | | | | |
| D3 | | | | 0 | | | | | |
| D4 | | 5 | 0.5 | 1 | | | | | |
| D5 | | | 7 | | | | | | |
| D6 | | 5 | 3 | 1 | 5 μm, ONCE | | | | |
| D7 | | 0 | | | | | | | |
| D8 | | | | 0 | | | | | |
| D9 | | 5 | 0.5 | 1 | | | | | |
| D10 | | | 7 | | | | | | |
| D11 | | 5 | 3 | 1 | 15 μm, THRICE | 200° C., 5 HOURS | | | |
| D12 | | 0 | | | | | | | |
| D13 | | | | 0 | | | | | |
| D14 | | 5 | 0.5 | 1 | | | | | |
| D15 | | | 7 | | | | | | |
| D16 | | 5 | 3 | 1 | | 300° C., 5 HOURS | | | |
| D17 | | 0 | | | | | | | |
| D18 | | | | 0 | | | | | |
| D19 | | 5 | 0.5 | 1 | | | | | |
| D20 | | | 7 | | | | | | |
| D21 | | 5 | 3 | 1 | | — | POROUS INSULATION LAYER ON NEGATIVE ELECTRODE PLATE | 97 | BM-720H |
| D22 | | 0 | | | | | | | |
| D23 | | | | 0 | | | | | |
| D24 | | 5 | 0.5 | 1 | | | | | |
| D25 | | | 7 | | | | | | |
| D26 | | 5 | 3 | 1 | | | | 90 | |
| D27 | | | | | | | | 70 | |
| D28 | | | | | | | | 50 | |
| D29 | | | | | | | ONLY ON POSITIVE ELECTRODE CORE MATERIAL | 97 | |
| D30 | | | | | | | | 90 | |
| D31 | | | | | | | | 70 | |
| D32 | | | | | | | | 50 | |
| D33 | | | | | | | BOTH ON NEGATIVE ELECTRODE PLATE AND POSITIVE ELECTRODE CORE MATERIAL | 97 | |
| D34 | | | | | | | | 90 | |
| D35 | | | | | | | | 70 | |
| D36 | | | | | | | | 50 | |
| D37 | | | 8 | | | — | — | — | |
| D38 | | | 3 | 5 | | | | | |
| D39 | | | | 1 | | | | | |
| D101 | | 7 | | | | | | | |
| D102 | | 5 | 0 | | | | | | |

| BATTERY NO. | PRESENCE OF HEAT-RESISTANT INSULATION LAYER ON SEPARATOR | RATE OF POSITIVE ELECTRODE ACTIVE MATERIAL EMBEDDED IN POSITIVE ELECTRODE CORE MATERIAL (%) | POSITIVE ELECTRODE PLATE RESISTANCE (Ω·cm$^2$) | NEGATIVE ELECTRODE PLATE RESISTANCE (Ω·cm$^2$) | DISCHARGE CHARACTERISTICS (mAh, 0° C.) | | NAIL PENETRATION TEST MAXIMUM REACHABLE TEMPERATURE (° C.) |
|---|---|---|---|---|---|---|---|
| | | | | | 400 mA | 4000 mA | |
| D1 | — | 5 | 0.65 | 0.05 | 1944 | 1855 | 71 |
| D2 | | 5 | 0.65 | | 1944 | 1854 | 69 |
| D3 | | 5 | 0.65 | | 1940 | 1851 | 70 |
| D4 | | 5 | 0.50 | | 1940 | 1851 | 68 |
| D5 | | 5 | 0.65 | | 1892 | 1830 | 70 |

TABLE 4-continued

| | | | | | | | |
|---|---|---|---|---|---|---|---|
| D6 | | 8 | 0.70 | | 1941 | 1852 | 70 |
| D7 | | 7 | 0.65 | | 1941 | 1851 | 70 |
| D8 | | 9 | 0.65 | | 1940 | 1854 | 75 |
| D9 | | 7 | 0.75 | | 1941 | 1850 | 68 |
| D10 | | 8 | 0.70 | | 1870 | 1828 | 72 |
| D11 | | 19 | 0.95 | | 1940 | 1851 | 71 |
| D12 | | 20 | 0.65 | | 1942 | 1854 | 72 |
| D13 | | 22 | 0.65 | | 1940 | 1848 | 71 |
| D14 | | 25 | 0.85 | | 1942 | 1854 | 77 |
| D15 | | 24 | 0.90 | | 1895 | 1802 | 69 |
| D16 | | 30 | 0.80 | | 1940 | 1855 | 71 |
| D17 | | 35 | 0.70 | | 1941 | 1852 | 71 |
| D18 | | 32 | 0.70 | | 1941 | 1852 | 71 |
| D19 | | 38 | 1.00 | | 1941 | 1851 | 72 |
| D20 | | 33 | 0.95 | | 1900 | 1810 | 68 |
| D21 | | 5 | 0.65 | $2 \times 10^{12}$ | 1942 | 1852 | 72 |
| D22 | | 5 | 0.65 | | 1939 | 1851 | 68 |
| D23 | | 5 | 0.65 | | 1942 | 1850 | 71 |
| D24 | | 5 | 0.50 | | 1938 | 1850 | 70 |
| D25 | | 5 | 0.65 | | 1895 | 1822 | 70 |
| D26 | | 5 | 0.65 | $1 \times 10^{12}$ | 1930 | 1854 | 75 |
| D27 | | 5 | 0.65 | $5 \times 10^{11}$ | 1940 | 1852 | 69 |
| D28 | | 5 | 0.65 | $4 \times 10^{10}$ | 1940 | 1845 | 72 |
| D29 | | 5 | 1.00 | 0.05 | 1937 | 1850 | 77 |
| D30 | | 5 | 0.95 | | 1940 | 1852 | 72 |
| D31 | | 5 | 0.90 | | 1939 | 1851 | 71 |
| D32 | | 5 | 0.85 | | 1935 | 1852 | 72 |
| D33 | | 5 | 1.00 | $2 \times 10^{12}$ | 1932 | 1850 | 70 |
| D34 | | 5 | 0.95 | $1 \times 10^{12}$ | 1941 | 1850 | 70 |
| D35 | | 5 | 0.90 | $5 \times 10^{11}$ | 1941 | 1854 | 70 |
| D36 | | 5 | 0.85 | $4 \times 10^{10}$ | 1940 | 1852 | 74 |
| D37 | | 4 | 0.60 | 0.05 | 1750 | 1650 | 65 |
| D38 | | 5 | 0.80 | | 1820 | 1672 | 66 |
| D39 | YES | 4 | 0.65 | | 1930 | 1845 | 70 |
| D101 | — | 5 | 0.35 | | 1842 | 1842 | 115 |
| D102 | | 4 | 0.35 | | 1840 | 1750 | 110 |

TABLE 5

| BATTERY NO. | COMPOSITION POSITIVE ELECTRODE MIXTURE LAYER (PARTS BY MASS) | | | | ROLLING CONDITION ROLLER CLEARANCE (μm) AND ROLLING NUMBER | CORE MATERIAL-SOFTENING CONDITION | ELECTRODE-PLATE INSULATION LAYER | | |
|---|---|---|---|---|---|---|---|---|---|
| | LITHIUM COMPOSITE OXIDE | ACETYLENE BLACK | PVDF | ALUMINA | | | REGION FORMED | ALUMINA CONTENT (MASS %) | BINDER |
| E1 | $Li_{1.03}Ni_{0.780}Co_{0.2}Al_{0.02}O_2$ CARRYING Mn(1 mol %) SUPPORTED ON THE SURFACE THEREOF (100 PARTS BY MASS) | 5 | 3 | 1 | 15 μm, THRICE | — | — | | |
| E2 | | 0 | | | | | | | |
| E3 | | | | 0 | | | | | |
| E4 | | 5 | 0.5 | 1 | | | | | |
| E5 | | | 7 | | | | | | |
| E6 | | 5 | 3 | 1 | 5 μm, ONCE | | | | |
| E7 | | 0 | | | | | | | |
| E8 | | | | 0 | | | | | |
| E9 | | 5 | 0.5 | 1 | | | | | |
| E10 | | | 7 | | | | | | |
| E11 | | 5 | 3 | 1 | 15 μm, THRICE | 200° C., 5 HOURS | | | |
| E12 | | 0 | | | | | | | |
| E13 | | | | 0 | | | | | |
| E14 | | 5 | 0.5 | 1 | | | | | |
| E15 | | | 7 | | | | | | |
| E16 | | 5 | 3 | 1 | | 300° C., 5 HOURS | | | |
| E17 | | 0 | | | | | | | |
| E18 | | | | 0 | | | | | |
| E19 | | 5 | 0.5 | 1 | | | | | |
| E20 | | | 7 | | | | | | |
| E21 | | 5 | 3 | 1 | — | | POROUS INSULATION LAYER ON NEGATIVE ELECTRODE PLATE | 97 | BM-720H |
| E22 | | 0 | | | | | | | |
| E23 | | | | 0 | | | | | |
| E24 | | 5 | 0.5 | 1 | | | | | |
| E25 | | | 7 | | | | | | |
| E26 | | 5 | 3 | 1 | | | | 90 | |
| E27 | | | | | | | | 70 | |
| E28 | | | | | | | | 50 | |
| E29 | | | | | | | ONLY ON | 97 | |

TABLE 5-continued

| | | | | | |
|---|---|---|---|---|---|
| E30 | | | | POSITIVE ELECTRODE CORE MATERIAL | 90 |
| E31 | | | | | 70 |
| E32 | | | | | 50 |
| E33 | | | | BOTH ON NEGATIVE ELECTRODE PLATE AND POSITIVE ELECTRODE CORE MATERIAL | 97 |
| E34 | | | | | 90 |
| E35 | | | | | 70 |
| E36 | | | | | 50 |
| E37 | | 8 | | — | — |
| E38 | | 3 | 5 | | |
| E39 | | | 1 | | |
| E101 | | 7 | | | |
| E102 | | 5 | 0 | | |

| BATTERY NO. | PRESENCE OF HEAT-RESISTANT INSULATION LAYER ON SEPARATOR | RATE OF POSITIVE ELECTRODE ACTIVE MATERIAL EMBEDDED IN POSITIVE ELECTRODE CORE MATERIAL (%) | POSITIVE ELECTRODE PLATE RESISTANCE ($\Omega \cdot cm^2$) | NEGATIVE ELECTRODE PLATE RESISTANCE ($\Omega \cdot cm^2$) | DISCHARGE CHARACTERISTICS (mAh, 0° C.) 400 mA | DISCHARGE CHARACTERISTICS (mAh, 0° C.) 4000 mA | NAIL PENETRATION TEST MAXIMUM REACHABLE TEMPERATURE (° C.) |
|---|---|---|---|---|---|---|---|
| E1 | — | 4 | 0.50 | 0.05 | 1921 | 1830 | 72 |
| E2 | | 5 | 0.50 | | 1920 | 1810 | 77 |
| E3 | | 4 | 0.60 | | 1920 | 1825 | 70 |
| E4 | | 4 | 0.60 | | 1920 | 1832 | 68 |
| E5 | | 5 | 0.55 | | 1875 | 1782 | 75 |
| E6 | | 8 | 0.65 | | 1922 | 1834 | 71 |
| E7 | | 7 | 0.55 | | 1922 | 1834 | 68 |
| E8 | | 8 | 0.60 | | 1920 | 1832 | 70 |
| E9 | | 9 | 0.60 | | 1921 | 1831 | 75 |
| E10 | | 9 | 0.55 | | 1850 | 1802 | 72 |
| E11 | | 12 | 0.65 | | 1920 | 1831 | 70 |
| E12 | | 15 | 0.55 | | 1910 | 1834 | 71 |
| E13 | | 16 | 0.60 | | 1920 | 1831 | 72 |
| E14 | | 14 | 0.70 | | 1919 | 1831 | 70 |
| E15 | | 15 | 0.75 | | 1872 | 1790 | 74 |
| E16 | | 25 | 0.70 | | 1921 | 1830 | 70 |
| E17 | | 24 | 0.55 | | 1922 | 1832 | 72 |
| E18 | | 24 | 0.60 | | 1921 | 1834 | 68 |
| E19 | | 25 | 0.65 | | 1924 | 1835 | 70 |
| E20 | | 21 | 0.70 | | 1875 | 1808 | 72 |
| E21 | | 4 | 0.50 | $2 \times 10^{12}$ | 1920 | 1831 | 69 |
| E22 | | 5 | 0.50 | | 1915 | 1832 | 71 |
| E23 | | 4 | 0.60 | | 1912 | 1830 | 68 |
| E24 | | 4 | 0.60 | | 1920 | 1835 | 72 |
| E25 | | 5 | 0.55 | | 1875 | 1802 | 71 |
| E26 | | 4 | 0.50 | $1 \times 10^{12}$ | 1880 | 1832 | 72 |
| E27 | | 4 | 0.50 | $5 \times 10^{11}$ | 1921 | 1832 | 70 |
| E28 | | 4 | 0.50 | $4 \times 10^{10}$ | 1921 | 1831 | 69 |
| E29 | | 4 | 0.85 | 0.05 | 1920 | 1834 | 77 |
| E30 | | 4 | 0.80 | | 1920 | 1832 | 70 |
| E31 | | 4 | 0.80 | | 1920 | 1828 | 71 |
| E32 | | 4 | 0.75 | | 1922 | 1830 | 71 |
| E33 | | 4 | 0.85 | $2 \times 10^{12}$ | 1919 | 1831 | 71 |
| E34 | | 4 | 0.80 | $1 \times 10^{12}$ | 1924 | 1834 | 70 |
| E35 | | 4 | 0.80 | $5 \times 10^{11}$ | 1917 | 1830 | 71 |
| E36 | | 4 | 0.75 | $4 \times 10^{10}$ | 1918 | 1830 | 69 |
| E37 | | 3 | 0.55 | 0.05 | 1942 | 1740 | 70 |
| E38 | | 5 | 0.45 | | 1955 | 1720 | 71 |
| E39 | YES | 5 | 0.45 | | 1920 | 1800 | 71 |
| E101 | — | 4 | 0.35 | | 1965 | 1880 | 122 |
| E102 | | 4 | 0.30 | | 1960 | 1730 | 111 |

TABLE 6

| Battery No. | Composition Positive Electrode Mixture Layer (Parts by Mass) Lithium Composite Oxide | Acetylene Black | PVDF | Alumina | Rolling Condition Roller Clearance (μm) and Rolling Number | Core Material-Softening Condition | Electrode-Plate Insulation Layer Region Formed | Alumina Content (Mass %) | Binder |
|---|---|---|---|---|---|---|---|---|---|
| F1 | $Li_{1.03}Ni_{0.780}Co_{0.2}Al_{0.02}O_2$ CARRYING Al(1 mol %) SUPPORTED ON THE SURFACE THEREOF (100 PARTS BY MASS) | 5 | 3 | 1 | 15 μm, THRICE | — | — | | |
| F2 | | 0 | | | | | | | |
| F3 | | | | 0 | | | | | |
| F4 | | 5 | 0.5 | 1 | | | | | |
| F5 | | | 7 | | | | | | |
| F6 | | 5 | 3 | 1 | 5 μm, ONCE | | | | |
| F7 | | 0 | | | | | | | |
| F8 | | | | 0 | | | | | |
| F9 | | 5 | 0.5 | 1 | | | | | |
| F10 | | | 7 | | | | | | |
| F11 | | 5 | 3 | 1 | 15 μm, THRICE | 200° C., 5 HOURS | | | |
| F12 | | 0 | | | | | | | |
| F13 | | | | 0 | | | | | |
| F14 | | 5 | 0.5 | 1 | | | | | |
| F15 | | | 7 | | | | | | |
| F16 | | 5 | 3 | 1 | | 300° C., 5 HOURS | | | |
| F17 | | 0 | | | | | | | |
| F18 | | | | 0 | | | | | |
| F19 | | 5 | 0.5 | 1 | | | | | |
| F20 | | | 7 | | | | | | |
| F21 | | 5 | 3 | 1 | — | | POROUS INSULATION LAYER ON NEGATIVE ELECTRODE PLATE | 97 | BM-720H |
| F22 | | 0 | | | | | | | |
| F23 | | | | 0 | | | | | |
| F24 | | 5 | 0.5 | 1 | | | | | |
| F25 | | | 7 | | | | | | |
| F26 | | 5 | 3 | 1 | | | | 90 | |
| F27 | | | | | | | | 70 | |
| F28 | | | | | | | | 50 | |
| F29 | | | | | | | ONLY ON POSITIVE ELECTRODE CORE MATERIAL | 97 | |
| F30 | | | | | | | | 90 | |
| F31 | | | | | | | | 70 | |
| F32 | | | | | | | | 50 | |
| F33 | | | | | | | BOTH ON NEGATIVE ELECTRODE PLATE AND POSITIVE ELECTRODE CORE MATERIAL | 97 | |
| F34 | | | | | | | | 90 | |
| F35 | | | | | | | | 70 | |
| F36 | | | | | | | | 50 | |
| F37 | | | 8 | | | | — | — | — |
| F38 | | | 3 | 5 | | | | | |
| F39 | | | | 1 | | | | | |
| F101 | | 7 | | | | | | | |
| F102 | | 5 | 0 | | | | | | |

| Battery No. | Presence of Heat-Resistant Insulation Layer on Separator | Rate of Positive Electrode Active Material Embedded in Positive Electrode Core Material (%) | Positive Electrode Plate Resistance ($\Omega \cdot cm^2$) | Negative Electrode Plate Resistance ($\Omega \cdot cm^2$) | Discharge Characteristics (mAh, 0° C.) 400 mA | Discharge Characteristics (mAh, 0° C.) 4000 mA | Nail Penetration Test Maximum Reachable Temperature (° C.) |
|---|---|---|---|---|---|---|---|
| F1 | — | 4 | 0.45 | 0.05 | 1927 | 1837 | 77 |
| F2 | | 2 | 0.55 | | 1923 | 1835 | 70 |
| F3 | | 4 | 0.50 | | 1926 | 1839 | 71 |
| F4 | | 4 | 0.50 | | 1920 | 1837 | 71 |
| F5 | | 5 | 0.45 | | 1880 | 1807 | 72 |
| F6 | | 8 | 0.50 | | 1926 | 1833 | 68 |
| F7 | | 7 | 0.60 | | 1927 | 1839 | 75 |
| F8 | | 6 | 0.55 | | 1924 | 1836 | 71 |
| F9 | | 7 | 0.55 | | 1926 | 1836 | 70 |
| F10 | | 7 | 0.60 | | 1880 | 1787 | 71 |
| F11 | | 19 | 0.65 | | 1915 | 1839 | 69 |
| F12 | | 20 | 0.60 | | 1926 | 1825 | 77 |
| F13 | | 19 | 0.55 | | 1925 | 1830 | 72 |
| F14 | | 16 | 0.65 | | 1926 | 1836 | 69 |
| F15 | | 18 | 0.65 | | 1855 | 1807 | 71 |
| F16 | | 22 | 0.70 | | 1917 | 1833 | 74 |

TABLE 6-continued

| | | | | | | | |
|---|---|---|---|---|---|---|---|
| F17 | | 25 | 0.60 | | 1917 | 1835 | 71 |
| F18 | | 28 | 0.55 | | 1925 | 1840 | 71 |
| F19 | | 29 | 0.60 | | 1924 | 1836 | 70 |
| F20 | | 27 | 0.60 | | 1877 | 1795 | 69 |
| F21 | | 4 | 0.45 | $2 \times 10^{12}$ | 1925 | 1837 | 70 |
| F22 | | 2 | 0.55 | | 1927 | 1835 | 70 |
| F23 | | 4 | 0.50 | | 1925 | 1833 | 70 |
| F24 | | 4 | 0.50 | | 1926 | 1835 | 75 |
| F25 | | 5 | 0.45 | | 1880 | 1813 | 72 |
| F26 | | 4 | 0.45 | $1 \times 10^{12}$ | 1926 | 1837 | 70 |
| F27 | | 4 | 0.45 | $5 \times 10^{11}$ | 1929 | 1837 | 71 |
| F28 | | 4 | 0.45 | $4 \times 10^{10}$ | 1925 | 1836 | 68 |
| F29 | | 4 | 0.75 | 0.05 | 1925 | 1837 | 70 |
| F30 | | 4 | 0.70 | | 1925 | 1837 | 68 |
| F31 | | 4 | 0.65 | | 1922 | 1835 | 72 |
| F32 | | 4 | 0.60 | | 1927 | 1839 | 68 |
| F33 | | 4 | 0.75 | $2 \times 10^{12}$ | 1929 | 1840 | 70 |
| F34 | | 4 | 0.70 | $1 \times 10^{12}$ | 1925 | 1839 | 72 |
| F35 | | 4 | 0.65 | $5 \times 10^{11}$ | 1925 | 1836 | 72 |
| F36 | | 4 | 0.60 | $4 \times 10^{10}$ | 1925 | 1836 | 72 |
| F37 | | 3 | 0.65 | 0.05 | 1750 | 1650 | 68 |
| F38 | | 4 | 0.50 | | 1901 | 1620 | 69 |
| F39 | YES | 4 | 0.50 | | 1920 | 1835 | 69 |
| F101 | — | 5 | 0.25 | | 1920 | 1833 | 111 |
| F102 | | 4 | 0.30 | | 1918 | 1700 | 112 |

TABLE 7

| BATTERY NO. | COMPOSITION POSITIVE ELECTRODE MIXTURE LAYER (PARTS BY MASS) | | | | ROLLING CONDITION ROLLER CLEARANCE (μm) AND ROLLING NUMBER | CORE MATERIAL-SOFTENING CONDITION | ELECTRODE-PLATE INSULATION LAYER | | |
|---|---|---|---|---|---|---|---|---|---|
| | LITHIUM COMPOSITE OXIDE | ACETYLENE BLACK | PVDF | ALUMINA | | | REGION FORMED | ALUMINA CONTENT (MASS %) | BINDER |
| G1 | Li$_{1.03}$Ni$_{0.780}$Co$_{0.2}$Al$_{0.02}$O$_2$ | 5 | 3 | 1 | 15 μm, THRICE | — | — | — | — |
| G2 | CARRYING Mg(1 mol %) | 0 | | | | | | | |
| G3 | SUPPORTED ON THE | | | 0 | | | | | |
| G4 | SURFACE THEREOF | 5 | 0.5 | 1 | | | | | |
| G5 | (100 PARTS | | 7 | | | | | | |
| G6 | BY MASS) | 5 | 3 | 1 | 5 μm, ONCE | | | | |
| G7 | | 0 | | | | | | | |
| G8 | | | | 0 | | | | | |
| G9 | | 5 | 0.5 | 1 | | | | | |
| G10 | | | 7 | | | | | | |
| G11 | | 5 | 3 | 1 | 15 μm, THRICE | 200° C., 5 HOURS | | | |
| G12 | | 0 | | | | | | | |
| G13 | | | | 0 | | | | | |
| G14 | | 5 | 0.5 | 1 | | | | | |
| G15 | | | 7 | | | | | | |
| G16 | | 5 | 3 | 1 | | 300° C., 5 HOURS | | | |
| G17 | | 0 | | | | | | | |
| G18 | | | | 0 | | | | | |
| G19 | | 5 | 0.5 | 1 | | | | | |
| G20 | | | 7 | | | | | | |
| G21 | | 5 | 3 | 1 | | — | POROUS INSULATION LAYER ON NEGATIVE ELECTRODE PLATE | 97 | BM-720H |
| G22 | | 0 | | | | | | | |
| G23 | | | | 0 | | | | | |
| G24 | | 5 | 0.5 | 1 | | | | | |
| G25 | | | 7 | | | | | | |
| G26 | | 5 | 3 | 1 | | | | 90 | |
| G27 | | | | | | | | 70 | |
| G28 | | | | | | | | 50 | |
| G29 | | | | | | | ONLY ON POSITIVE ELECTRODE CORE MATERIAL | 97 | |
| G30 | | | | | | | | 90 | |
| G31 | | | | | | | | 70 | |
| G32 | | | | | | | | 50 | |
| G33 | | | | | | | BOTH ON NEGATIVE ELECTRODE PLATE AND POSITIVE ELECTRODE CORE MATERIAL | 97 | |
| G34 | | | | | | | | 90 | |
| G35 | | | | | | | | 70 | |
| G36 | | | | | | | | 50 | |

TABLE 7-continued

| Battery No. | | | | |
|---|---|---|---|---|
| G37 | | 8 | | |
| G38 | | 3 | 5 | |
| G39 | | | | 1 |
| G101 | 7 | | | |
| G102 | | 5 | 0 | |

| BATTERY NO. | PRESENCE OF HEAT-RESISTANT INSULATION LAYER ON SEPARATOR | RATE OF POSITIVE ELECTRODE ACTIVE MATERIAL EMBEDDED IN POSITIVE ELECTRODE CORE MATERIAL (%) | POSITIVE ELECTRODE PLATE RESISTANCE ($\Omega \cdot cm^2$) | NEGATIVE ELECTRODE PLATE RESISTANCE ($\Omega \cdot cm^2$) | DISCHARGE CHARACTERISTICS (mAh, 0° C.) | | NAIL PENETRATION TEST MAXIMUM REACHABLE TEMPERATURE (° C.) |
|---|---|---|---|---|---|---|---|
| | | | | | 400 mA | 4000 mA | |
| G1 | — | 5 | 0.45 | 0.05 | 1935 | 1849 | 77 |
| G2 | | 4 | 0.55 | | 1936 | 1846 | 72 |
| G3 | | 3 | 0.50 | | 1925 | 1847 | 69 |
| G4 | | 4 | 0.45 | | 1925 | 1849 | 72 |
| G5 | | 5 | 0.40 | | 1865 | 1797 | 69 |
| G6 | | 7 | 0.65 | | 1937 | 1849 | 72 |
| G7 | | 7 | 0.55 | | 1935 | 1825 | 72 |
| G8 | | 6 | 0.55 | | 1937 | 1845 | 70 |
| G9 | | 7 | 0.50 | | 1935 | 1846 | 71 |
| G10 | | 7 | 0.55 | | 1887 | 1823 | 71 |
| G11 | | 19 | 0.65 | | 1937 | 1849 | 71 |
| G12 | | 18 | 0.55 | | 1934 | 1846 | 77 |
| G13 | | 12 | 0.55 | | 1939 | 1849 | 71 |
| G14 | | 15 | 0.65 | | 1936 | 1845 | 68 |
| G15 | | 18 | 0.75 | | 1890 | 1805 | 70 |
| G16 | | 21 | 0.75 | | 1935 | 1843 | 68 |
| G17 | | 24 | 0.55 | | 1939 | 1850 | 70 |
| G18 | | 20 | 0.55 | | 1927 | 1845 | 70 |
| G19 | | 21 | 0.60 | | 1935 | 1847 | 68 |
| G20 | | 25 | 0.75 | | 1890 | 1817 | 75 |
| G21 | | 5 | 0.45 | $2 \times 10^{12}$ | 1930 | 1847 | 70 |
| G22 | | 4 | 0.55 | | 1935 | 1847 | 72 |
| G23 | | 3 | 0.50 | | 1933 | 1847 | 71 |
| G24 | | 4 | 0.45 | | 1932 | 1845 | 70 |
| G25 | | 5 | 0.40 | | 1895 | 1817 | 72 |
| G26 | | 5 | 0.45 | $1 \times 10^{12}$ | 1933 | 1845 | 69 |
| G27 | | 5 | 0.45 | $5 \times 10^{11}$ | 1935 | 1846 | 71 |
| G28 | | 5 | 0.45 | $4 \times 10^{10}$ | 1936 | 1847 | 68 |
| G29 | | 5 | 0.80 | 0.05 | 1935 | 1846 | 70 |
| G30 | | 5 | 0.75 | | 1936 | 1847 | 75 |
| G31 | | 5 | 0.70 | | 1935 | 1850 | 71 |
| G32 | | 5 | 0.70 | | 1936 | 1845 | 70 |
| G33 | | 5 | 0.80 | $2 \times 10^{12}$ | 1936 | 1846 | 74 |
| G34 | | 5 | 0.75 | $1 \times 10^{12}$ | 1936 | 1849 | 71 |
| G35 | | 5 | 0.70 | $5 \times 10^{11}$ | 1935 | 1840 | 72 |
| G36 | | 5 | 0.70 | $4 \times 10^{10}$ | 1935 | 1847 | 70 |
| G37 | | 3 | 0.60 | 0.05 | 1860 | 1702 | 65 |
| G38 | | 4 | 0.55 | | 1925 | 1720 | 62 |
| G39 | YES | 5 | 0.50 | | 1930 | 1850 | 65 |
| G101 | — | 4 | 0.25 | | 1930 | 1842 | 115 |
| G102 | | 3 | 0.30 | | 1932 | 1735 | 112 |

TABLE 8

| BATTERY NO. | NEGATIVE ELECTRODE ACTIVE MATERIAL | NEGATIVE ELECTRODE PLATE RESISTANCE ($\Omega \cdot cm^2$) | POSITIVE ELECTRODE PLATE RESISTANCE ($\Omega \cdot cm^2$) | DISCHARGE CHARACTERISTICS (mAh, 0° C.) | | NAIL PENETRATION TEST MAXIMUM REACHABLE TEMPERATURE(° C.) |
|---|---|---|---|---|---|---|
| | | | | 400 mA | 4000 mA | |
| H1 | $SiO_{0.3}$ | 0.50 | 0.20 | 2002 | 1950 | 77 |
| H2 | $SiO_{1.3}$ | 0.55 | | 2004 | 1955 | 75 |
| H3 | $SnO_{0.3}$ | 0.50 | | 2005 | 1954 | 72 |
| H4 | $SnO_{1.3}$ | 0.50 | | 2004 | 1956 | 71 |
| H101 | SYNTHETIC GRAPHITE | 0.11 | | 1970 | 1890 | 122 |

Each of the Example batteries A1 to A5 having a positive electrode plate resistance of 0.4Ω·cm² or more, which was raised by addition of alumina to the positive electrode mixture, had lower maximum reachable temperature in the nail penetration test.

Example battery A6 to A10 having an increased rate of the cathode material embedded in the aluminum current collector by reduction of the clearance between rollers during roll pressing had further higher electrode plate resistance of the positive electrode plate in the charged state and thus, further lower maximum reachable temperature.

Alternatively, Example batteries A11 to A20 prepared from a softened positive electrode aluminum current collector, which have a higher rate of the cathode material embedded in the positive electrode current collector, had further higher electrode plate resistance of the positive electrode plate and further lower maximum reachable temperature.

Example batteries A21 to A28 having a porous insulation layer on the negative electrode plate, which has a high-resistance insulation layer formed between the negative electrode plate and the positive electrode plate, gave smaller short-circuit current during short circuiting and thus, had significantly reduced maximum reachable temperature.

Alternatively, Example batteries A29 to A32 having an insulation layer on the positive electrode aluminum current collector showed lower maximum reachable temperature, because of increase of the electrode plate resistance of the positive electrode plate.

Yet alternatively, Example batteries A33 to A36 having an insulation layer both on the positive electrode current collector and the negative electrode plate had lower maximum reachable temperature.

Yet alternatively, Example battery A39 having a heat-resistant porous insulation layer on the separator had lower maximum reachable temperature, because of decrease in the short circuiting area between the positive and negative electrode plates.

On the other hand, Example battery A37 having a binder resin content of 8 parts by mass had increased positive electrode plate resistance and reduced maximum reachable temperature, but also a slightly declined discharge capacity when discharged at 4000 mA (2 CmA) at 0° C., because the active material particles are coated with the binder resin at a greater rate.

Example battery A38 having a high alumina content in the positive electrode mixture had higher positive electrode plate resistance and lower maximum reachable temperature. However, the discharge capacity was slightly lower.

On the other hand, Comparative Example battery A101 containing a conductive substance in the positive electrode mixture layer at high rate and having a positive electrode plate resistance of 0.3Ω·cm² had higher maximum reachable temperature.

Alternatively, Comparative Example battery A102 containing no binder and having a positive electrode plate resistance of 0.35Ω·cm² had higher maximum reachable temperature, and a deteriorated discharge capacity at 2 CmA discharge at 0° C. because of deterioration in adhesiveness in the positive electrode mixture and thus in conductivity by shrinkage of the cathode material during charging and discharging.

Yet alternatively, Comparative Example battery A103 having a smaller alumina content in the positive electrode mixture layer and having a positive electrode plate resistance of 0.35Ω·cm² also had higher maximum reachable temperature.

Yet alternatively, Comparative Example battery A104 having a higher binder content in the positive electrode mixture layer but containing no alumina and having a positive electrode plate resistance of 0.3Ω·cm² also had higher maximum reachable temperature.

Example batteries B1 to B39 prepared with the lithium composite oxide II ($Li_{1.03}Ni_{0.78}Co_{0.20}Al_{0.02}O_2$), which in turn was prepared by adding 2 mol % Al to $Li_{1.03}Ni_{0.8}Co_{0.20}O_2$, and having a positive electrode plate resistance of 0.4Ω·cm² or more had high positive electrode plate resistance, even when the content of the conductive substance is higher and the alumina content lower in the positive electrode mixture, and thus had lower maximum reachable temperature.

Similarly to Comparative Example batteries A101 to A102, Comparative Example batteries B101 to B102 contained a conductive substance at high content and thus had smaller positive electrode plate resistance and lower maximum reachable temperature, or had a deteriorated discharge capacity at 2 CmA discharge at 0° C. due to its low binder content.

Example batteries C1 to 39 and Comparative Example batteries C101 to C102 prepared with a cathode material added with Mg replacing Al; Example batteries D1 to D39 and Comparative Example batteries D101 to D102 prepared with a cathode material added with Mn; and also Example batteries E1 to E39 and Comparative Example batteries E101 to E102, or Example batteries F1 to F39 and Comparative Example batteries F101 to F102, or Example batteries G1 to G39 and Comparative Example batteries G101 to G102 prepared with a cathode material carrying Mn, Al or Mg on the surface of $Li_{1.03}Ni_{0.78}Co_{0.20}Al_{0.02}O_2$ gave similar results.

Alternatively, Example batteries H1 to H4 prepared with an anode material containing at least Si- or Sn-containing oxide particles and having a negative electrode plate resistance of 0.4Ω·cm² or more had high negative electrode plate resistance and thus lower maximum reachable temperature.

Yet alternatively, Comparative Example battery H101 prepared with an anode material of synthetic graphite having a negative electrode plate resistance of less than 0.4Ω·cm² had higher maximum reachable temperature.

As described above in detail, an aspect of the present invention is a nonaqueous electrolyte secondary battery, comprising; a positive electrode plate having a positive electrode current collector and a positive electrode mixture layer containing a cathode material capable of absorbing and desorbing lithium, a negative electrode plate having a negative electrode current collector and a negative electrode mixture layer containing an anode material capable of absorbing and desorbing lithium, a separator held between the positive electrode plate and the negative electrode plate, a nonaqueous electrolyte, and, a battery case which enclose the positive electrode plate, the negative electrode plate, the separator, and the nonaqueous electrolyte therein, wherein at least one of the positive electrode plate and the negative electrode plate has an electrode plate resistance, as determined in the charged state and when pressurized at 50 kg/cm², of 0.4Ω·cm² or more in the thickness direction. In such a configuration, it is possible to control the short-circuiting current flowing during nail penetration test effectively and prevent the battery from being heated at high temperature, by regulating the resistance of the electrode plate in the charged state.

The cathode material preferably contains a lithium composite oxide represented by the following General Formula (1).

$$Li_xM_{1-y}L_yO_2 \qquad (1)$$

(in General Formula (1), 0.85≦x≦1.25; 0≦y≦0.5; M represents at least one element selected from the group consisting of Ni and Co; and L represents at least one element selected from the group consisting of alkali-earth elements, transition elements excluding Ni and Co, rare earth elements, group IIIb elements and group IVb elements).

In such a configuration, it is possible to obtain a positive electrode plate having high electrode plate resistance in the charged state.

Also in the lithium composite oxide represented by General Formula (1), L preferably represents at least one element selected from the group consisting of Al, Mn, Ti, Mg, Zr, Nb, Mo, W and Y.

In such a configuration, it is possible to obtain a positive electrode plate having higher electrode plate resistance.

The cathode material preferably supports at least one element selected from the group consisting of Al, Mn, Ti, Mg, Zr, Nb, Mo, W and Y on the surface. In such a configuration, it is possible to obtain a positive electrode plate having high electrode plate resistance, because the resistance of the cathode material in the charged state is raised further.

In addition, the positive electrode mixture layer and/or the negative electrode mixture layer preferably contains an insulative powder material having a resistivity, as determined at 25° C. as it is pressed to a compression density of 4 g/cm$^3$, of $10^{10}$ ($\Omega$·cm) or more. In such a configuration, it is possible to obtain a positive electrode plate having high electrode plate resistance.

Also preferably, the positive electrode plate has an insulation layer formed between the positive electrode current collector and the positive electrode mixture layer so that part of the cathode material in the positive electrode mixture layer is brought into contact with the positive electrode current collector, and/or the negative electrode plate has an insulation layer formed between the negative electrode current collector and the negative electrode mixture layer so that part of the anode material in the negative electrode mixture layer is brought into contact with the negative electrode current collector. It is possible to obtain a positive or negative electrode plate having higher electrode plate resistance in the charged state, by forming an insulation layer between each electrode current collector and each electrode mixture layer in this way.

The positive electrode plate and/or the negative electrode plate preferably has a porous insulation layer on the surface. It is possible in such a configuration to raise the electrode plate resistance of the positive electrode plate and/or the negative electrode plate significantly without inhibition of ionic permeation, and thus, to control the short-circuit current when the positive and negative electrode plates are short-circuited and the heat generation during short circuiting effectively.

In addition, the separator preferably has a heat-resistant porous insulation layer on the surface. It is possible in such a configuration to raise the heat resistance of the resin separator and to prevent fusion of the separator by the Joule's heat generated during short circuiting. It is also possible by preventing fusion of the separator by short circuiting, to reduce the contact area between the positive and negative electrode plates, reduce the short-circuit current, and control the heat generation by short circuiting.

The anode material preferably contains metal oxide particles containing at least one element selected from the group consisting of Si and Sn. In such a configuration, it is possible to obtain a negative electrode plate having high electrode plate resistance.

The present invention provides a nonaqueous electrolyte secondary battery that prevents continued short circuiting in battery, if it occurs, and thus prevents exposure of the battery to high temperature.

INDUSTRIAL APPLICABILITY

The present invention is applicable generally as a nonaqueous electrolyte secondary battery and useful in particular as a nonaqueous electrolyte secondary battery containing a lithium-containing composite oxide having nickel or cobalt as the principal component, as the cathode material. The shape of the nonaqueous electrolyte secondary battery according to the present invention is not particularly limited, and may be, any shape such as coin, button, sheet, cylinder, plat plate, or square plate. The electrode plates including a positive electrode, a negative electrode and a separator may be wound or flatly laminated. The battery may be smaller in size for use in small portable devices and others, or larger for use in electric vehicles and others. Thus, the nonaqueous electrolyte secondary battery according to the present invention can be used as a power supply, for example, for portable information systems such as personal digital assistants, portable electronic devices, domestic small power-storage devices, motorcycles, electric vehicles, hybrid electric vehicles and others. However, the applications are not particularly limited thereto.

The invention claimed is:

1. A nonaqueous electrolyte secondary battery, comprising;
    a positive electrode plate having a positive electrode current collector and a positive electrode mixture layer containing a cathode material capable of absorbing and desorbing lithium,
    a negative electrode plate having a negative electrode current collector and a negative electrode mixture layer containing an anode material capable of absorbing and desorbing lithium,
    a separator held between the positive electrode plate and the negative electrode plate,
    a nonaqueous electrolyte, and,
    a battery case which enclose the positive electrode plate, the negative electrode plate, the separator, and the nonaqueous electrolyte therein,
    wherein at least one of the positive electrode plate and the negative electrode plate has an electrode plate resistance, as determined in the charged state and when pressurized at 50 kg/cm$^2$, of 0.4$\Omega$·cm$^2$ or more in the thickness direction,
    the positive electrode plate has an insulation layer formed between the positive electrode current collector and the positive electrode mixture layer so that part of the cathode material in the positive electrode mixture layer is brought into contact with the positive electrode current collector,
    at least one of the positive electrode mixture layer and/or the negative electrode mixture layer contains an insulative powder material, and
    the insulative powder material contains at least one inorganic oxide filler selected from the group consisting of alumina (Al$_2$O$_3$), titania (TiO$_2$), silica (SiO$_2$O), zirconia (ZrO$_2$), and magnesia (MgO).

2. The nonaqueous electrolyte secondary battery according to claim 1, wherein the cathode material contains a lithium composite oxide represented by the following General Formula (I):

$$Li_xM_{1-y}L_yO_2 \qquad (1)$$

(in General Formula (I), 0.85$\leq$x$\leq$1.25; 0$\leq$y$\leq$0.5; M represents at least one element selected from the group consisting of Ni and Co; and L represents at least one element selected from the group consisting of alkali-earth elements, transition elements excluding Ni and Co, rare earth elements, group IIIb elements and group IVb elements).

3. The nonaqueous electrolyte secondary battery according to claim 2, wherein L in General Formula (I) above represents at least one element selected from the group consisting of Al, Mn, Ti, Mg, Zr, Nb, Mo, W and Y.

4. The nonaqueous electrolyte secondary battery according to claim 2, wherein at least one element selected from the group consisting of Al, Mn, Ti, Mg, Zr, Nb, Mo, W and Y is supported on the surface of the cathode material.

5. The nonaqueous electrolyte secondary battery according to claim 1, wherein the insulative powder material has a resistivity, as determined at 25° C. as it is pressed to a compression density of 4 g/cm$^3$, of $10^{10}$ (Ω·cm) or more.

6. The nonaqueous electrolyte secondary battery according to claim 1, wherein at least one of the positive electrode plate and the negative electrode plate has a porous insulation layer on the surface.

7. The nonaqueous electrolyte secondary battery according to claim 1, wherein the separator has a heat-resistant porous insulation layer on the surface.

8. The nonaqueous electrolyte secondary battery according to claim 1, wherein the anode material contains metal oxide particles containing at least one element selected from the group consisting of Si and Sn.

9. The nonaqueous electrolyte secondary battery according to claim 1, wherein the positive electrode plate has an insulation layer formed between the positive electrode current collector and the positive electrode mixture layer so that part of the cathode material in the positive electrode mixture layer is brought into contact with the positive electrode current collector, and the negative electrode plate has an insulation layer formed between the negative electrode current collector and the negative electrode mixture layer so that part of the anode material in the negative electrode mixture layer is brought into contact with the negative electrode current collector.

10. The nonaqueous electrolyte secondary battery according to claim 5, the positive electrode mixture layer or the negative electrode mixture layer contains the insulative powder material of about 1 to 20 parts by mass with respect to 100 parts by mass of the cathode material or the anode material.

11. The nonaqueous electrolyte secondary battery according to claim 1, wherein the insulation layer comprises a resin composition which contains an inorganic oxide filler of about 50 to 99 mass % therein.

12. The nonaqueous electrolyte secondary battery according to claim 1, wherein the insulation layer comprises a resin composition which contains an inorganic oxide filler of about 50 to 99 mass % therein.

13. The nonaqueous electrolyte secondary battery according to claim 7, wherein the heat-resistant porous insulation layer contains a resin component which has a heat deflection temperature of 250° C. or higher.

14. The nonaqueous electrolyte secondary battery according to claim 7, wherein the heat-resistant porous insulation layer contains an inorganic oxide filler of about 50 to 99 mass %.

15. A nonaqueous electrolyte secondary battery, comprising;
a positive electrode plate having a positive electrode current collector and a positive electrode mixture layer containing a cathode material capable of absorbing and desorbing lithium,
a negative electrode plate having a negative electrode current collector and a negative electrode mixture layer containing an anode material capable of absorbing and desorbing lithium,
a separator held between the positive electrode plate and the negative electrode plate,
a nonaqueous electrolyte, and,
a battery case which encloses the positive electrode plate, the negative electrode plate, the separator, and the nonaqueous electrolyte therein,
wherein at least one of the positive electrode plate and the negative electrode plate has an electrode plate resistance, as determined in the charged state and when pressurized at 50 kg/cm$^2$, of 0. 4Ω·cm$^2$ or more in the thickness direction,
the negative electrode plate has an insulation layer formed between the negative electrode current collector and the negative electrode mixture layer so that part of the anode material in the negative electrode mixture layer is brought into contact with the negative electrode current collector,
at least one of the positive electrode mixture layer and/or the negative electrode mixture layer contains an insulative powder material, and
the insulative powder material contains at least one inorganic oxide filler selected from the group consisting of alumina (Al$_2$O$_3$), titania (TiO$_2$), silica (SiO$_3$), zirconia (ZrO$_2$), and magnesia (MgO).

* * * * *